(12) United States Patent
Pavlovski et al.

(10) Patent No.: US 10,094,586 B2
(45) Date of Patent: Oct. 9, 2018

(54) PREDICTIVE BUILDING CONTROL SYSTEM AND METHOD FOR OPTIMIZING ENERGY USE AND THERMAL COMFORT FOR A BUILDING OR NETWORK OF BUILDINGS

(71) Applicants: Alexandre Pavlovski, Bedford (CA); Zheng Qin, Dartmouth (CA); Dmitriy Anichkov, Somerville, NJ (US); James Fletcher, Tantallon (CA)

(72) Inventors: Alexandre Pavlovski, Bedford (CA); Zheng Qin, Dartmouth (CA); Dmitriy Anichkov, Somerville, NJ (US); James Fletcher, Tantallon (CA)

(73) Assignee: GREEN POWER LABS INC., Darmouth, Nova Scotia (CA)

( * ) Notice: Subject to any disclaimer, the term of this patent is extended or adjusted under 35 U.S.C. 154(b) by 533 days.

(21) Appl. No.: 14/690,671

(22) Filed: Apr. 20, 2015

(65) Prior Publication Data

US 2016/0305678 A1    Oct. 20, 2016

(51) Int. Cl.
*G05D 13/00* (2006.01)
*G05D 15/00* (2006.01)
(Continued)

(52) U.S. Cl.
CPC .............. *F24F 11/30* (2018.01); *F24F 11/62* (2018.01); *G05B 13/048* (2013.01); *G05B 15/02* (2013.01);
(Continued)

(58) Field of Classification Search
CPC ................ F24F 11/0012; F24F 11/006; F24F 2011/0013; F24F 2011/0047; F24F 2011/0058; F24F 2011/0075
(Continued)

(56) References Cited

U.S. PATENT DOCUMENTS 6,098,893 A    8/2000 Berglund et al.
7,894,943 B2   2/2011 Sloup et al.
(Continued)

FOREIGN PATENT DOCUMENTS

WO    2009039849 A1    4/2009

OTHER PUBLICATIONS

International Search Report and Written Opinion for corresponding application No. PCT/CA2016/000107, dated Jun. 3, 2016.
(Continued)

*Primary Examiner* — Michael J Brown

(57) ABSTRACT

A method for controlling temperature in a thermal zone within a building, comprising: using a processor, receiving a desired temperature range for the thermal zone; determining a forecast ambient temperature value for an external surface of the building proximate the thermal zone; using a predictive model for the building, determining set points for a heating, ventilating, and air conditioning ("HVAC") system associated with the thermal zone that minimize energy use by the building; the desired temperature range and the forecast ambient temperature value being inputs to the predictive model; the predictive model being trained using respective historical measured value data for at least one of the inputs; and, controlling the HVAC system with the set points to maintain an actual temperature value of the thermal zone within the desired temperature range for the thermal zone.

30 Claims, 22 Drawing Sheets

(51) Int. Cl.

| | | |
|---|---|---|
| *F24F 11/30* | (2018.01) | |
| *G05B 13/04* | (2006.01) | |
| *G05B 15/02* | (2006.01) | |
| *F24F 11/62* | (2018.01) | |
| *F24F 110/10* | (2018.01) | |
| *F24F 110/12* | (2018.01) | |
| *F24F 120/10* | (2018.01) | |
| *F24F 120/12* | (2018.01) | |
| *F24F 140/50* | (2018.01) | |
| *F24F 140/60* | (2018.01) | |
| *F24F 130/20* | (2018.01) | |
| *F24F 130/00* | (2018.01) | |
| *F24F 130/10* | (2018.01) | |
| *F24F 11/64* | (2018.01) | |
| *F24F 11/65* | (2018.01) | |
| *F24F 11/46* | (2018.01) | |

(52) U.S. Cl.
CPC ............... *F24F 11/46* (2018.01); *F24F 11/64* (2018.01); *F24F 11/65* (2018.01); *F24F 2110/10* (2018.01); *F24F 2110/12* (2018.01); *F24F 2120/10* (2018.01); *F24F 2120/12* (2018.01); *F24F 2130/00* (2018.01); *F24F 2130/10* (2018.01); *F24F 2130/20* (2018.01); *F24F 2140/50* (2018.01); *F24F 2140/60* (2018.01); *G05B 2219/2642* (2013.01)

(58) Field of Classification Search
USPC .................................................. 700/276, 277
See application file for complete search history.

(56) References Cited

U.S. PATENT DOCUMENTS

| | | | | |
|---|---|---|---|---|
| 7,954,726 | B2* | 6/2011 | Siddaramanna ... | B60H 1/00985 236/46 R |
| 8,172,153 | B1* | 5/2012 | Kennedy ............. | F24D 19/1048 236/1 B |
| 8,457,802 | B1 | 6/2013 | Steven et al. | |
| 8,600,561 | B1 | 12/2013 | Modi et al. | |
| 9,869,484 | B2* | 1/2018 | Hester ................... | G05B 17/02 |
| 2010/0070234 | A1 | 3/2010 | Steinberg et al. | |
| 2010/0262298 | A1 | 10/2010 | Johnson et al. | |
| 2011/0276527 | A1 | 11/2011 | Pitcher et al. | |
| 2012/0259469 | A1 | 10/2012 | Ward et al. | |
| 2014/0046891 | A1* | 2/2014 | Banas ................... | G06N 5/022 706/46 |
| 2014/0067142 | A1 | 3/2014 | Steven et al. | |
| 2014/0148953 | A1 | 5/2014 | Nwankpa et al. | |
| 2014/0277760 | A1* | 9/2014 | Marik ..................... | F24F 11/00 700/276 |
| 2014/0365017 | A1* | 12/2014 | Hanna .................. | F24F 11/001 700/276 |
| 2015/0235143 | A1* | 8/2015 | Eder ...................... | G16H 50/50 706/12 |

OTHER PUBLICATIONS

Georgakis, C. and M. Santamouris, "On the Estimation of Wind Speed in Urban Canyons for Ventilation Purposes—Part 1: Coupling Between the Undisturbed Wind Speed and the Canyon Wind". Building and Environment, vol. 43 (2008). pp. 1404-1410.

Hotchkiss, R. and F. Harlow, "Air Pollution Transport in Street Canyons", Washington DC: Office of Research and Monitoring. 1973.

Swaid, H. and M. Hoffman, "Prediction of Urban Air Temperature Variations Using the Analytical CTTC Model", Energy and Buildings, vol. 14 (1990), pp. 313-324.

Elnahas, M. and T. Williamson, "An Improvement of the CTTC Model for Predicting Urban Air Temperatures", Energy and Buildings, vol. 25 (1997), pp. 41-49.

Petty, G. W., "A First Course in Atmospheric Thermodynamics", Sundog Publishing, 2008, pp. 1-59.

* cited by examiner

PREDICTIVE BUILDING CONTROL SYSTEM AND METHOD FOR OPTIMIZING ENERGY USE AND THERMAL COMFORT FOR A BUILDING OR NETWORK OF BUILDINGS

FIELD OF THE INVENTION

This invention relates to the field of building control systems, and more specifically, to a method and system for predictive building control for optimizing energy use and thermal comfort for a building or network of buildings.

BACKGROUND OF THE INVENTION

Commercial, residential, and industrial buildings are responsible for a significant portion of the world's total energy use. Heating and cooling account for most of a building's energy consumption and typically are the most expensive items with respect to building energy costs as electrical power for heating and cooling is often purchased at peak rates. While the cost of heating and cooling buildings is increasing, the thermal comfort of building occupants remains an important concern as such comfort supports occupants' productivity, health, and is related to optimal operating conditions for buildings whether they be residential, commercial, or industrial.

A network or buildings (or a building network) may include several connected or associated buildings. Typically, a network of buildings includes one or more commercial, institutional, industrial, and residential buildings which are distributed over a geographic area. This geographic area may be local and relatively small (e.g., a rural community or urban district) or global and covering any number of jurisdictions. The network of buildings may be operated by its owner or manager who may be an individual or corporation. Each building may include one or more thermal zones where thermal comfort control is required.

Typically, the energy supply to a building or network of buildings is provided by one or more utilities by way of electricity, steam, water, or any other energy carrier or a combination thereof delivered through one or more heating, ventilating, and air conditioning ("HVAC") devices. These devices maintain required or desired thermal, air quality, and related operating conditions in each building of the network of buildings. For example, a building may use a heat supply from a centralized steam utility (e.g., district heating), an individual chiller, and an individual ventilation device to maintain the required temperature in each thermal zone of the building.

The operating conditions and related energy use in the network of buildings and in each individual building are typically managed by a building energy management system ("BEMS"). The building energy management system controls all HVAC devices in the network to keep thermal and air quality operating conditions in each individual building of the network within a desired range. The thermal parameters controlled by the building energy management system, hereinafter referred to as control parameters, include but are not limited to thermal zone temperature, relative humidity, and air quality. The reference values for the control parameters, hereinafter referred to as set points, include but are not limited to reference values for thermal zone temperature, reference values for relative humidity, and reference values for air quality. Typically, at any time of the day, an individual building may use only one set of set points. This set of set points is predefined, scheduled by the building operator through the BEMS, and executed by the building HVAC system.

Each building in the network of buildings operates its HVAC systems within its own unique as built and natural environment. The as built and natural environment includes: the building location; the orientation of building faces (e.g., walls and roofs); shading from surrounding landscape, vegetation and buildings; heat waves and wind ventilation corridors from urban street canyons; etc. Each building also has its own individual architectural design, including, the internal configuration of building space defined by building use, specifically, the number, location and configuration of thermal comfort zones within the building. Due to the external built environment and internal building space configuration, the ambient weather conditions affecting different building faces (e.g., direct sunlight, shading, wind direction, etc.) may create dramatically different thermal conditions in different thermal zones within the building leading to the need to heat one part of the building while cooling another part to meet the thermal comfort requirements of the buildings' occupants. The need to meet highly granular thermal comfort requirements in buildings to maintain thermal comfort in every thermal zone while minimizing the building's overall heating and cooling energy costs requires new approaches to building energy management.

In addition, as the number of buildings in a network of buildings and their cumulative energy use grows, the ability of a typical BEMS to optimize building energy use based on current and anticipated operating conditions in each building, to respond to limitations in energy resources and energy budgets, to reduce carbon footprints, and to participate in energy markets becomes increasing important. As mentioned above, these requirements call for a granular approach to managing thermal comfort in building thermal zones to support the productivity, health, and wellbeing of building occupants while minimizing the building's overall energy use, costs, and carbon footprint.

Several methods and systems for optimizing energy use in commercial, residential, and industrial buildings have been proposed. For example, U.S. Patent Application Publication No. 2011/0276527 by Pitcher, et al., entitled, "Balance Point Determination", describes systems, methods and associated software for developing a non-linear model of energy usage for a building or asset based on a plurality of weather measurements indicating weather conditions of a region in which an asset is located and a plurality of energy consumption measurements indicating amounts of energy consumed by the asset.

As another example, U.S. Pat. No. 6,098,893 to Berglund, et al., entitled "Comfort Control System Incorporating Weather Forecast Data and a Method for Operating such a System", describes a comfort control system for buildings that considers a number of building external factors in producing control instructions. The system includes structure for receiving weather forecast data, structure for combining the data with a group of external building characteristics to derive instruction signals for comfort control operations of a building, and structure for directing the instructing signals to the building management control means for appropriate buildings. The external building characteristics include, in particular, the height of the building, the cross-sectional profile of the building, the exterior cross-sectional shape of the building, and the degree of shelter afforded by adjacent buildings.

As an additional example, U.S. Pat. No. 8,600,561 to Modi, et al., entitled "Radiant Heating Controls and Methods for an Environmental Control System", describes devices, systems, and methods using predictive controls to condition an enclosure such as a home. Such controls may enhance the functionality of HVAC systems, especially when used with radiant heating systems. Modi, et al., describe thermostats that use model predictive controls and related methods.

As an additional example, U.S. Patent Application Publication No. 2010/0262298 by Johnson, et al., entitled "System and Method for Climate Control Set-Point Optimization Based on Individual Comfort", describes a system and method for calibrating a set point for climate control including a sensor network having a plurality of sensors configured to report a climate condition. A database is configured to receive reports from the sensors and generate one or more profiles reflecting historic climate information and occupant preferences. A controller is configured to receive information from the profiles to generate a set point based upon an optimization program. The optimization program is implemented to balance competing goals in controlling climate control equipment.

As an additional example, U.S. Pat. No. 7,894,943 to Sloup, et al., entitled "Real-Time Global Optimization of Building Setpoints and Sequence of Operation", describes a building heating/cooling system energy optimization method for a building having a heating/cooling system based on the steps of providing a mathematical model of the heating/cooling system, obtaining real-time weather information, reading the input water temperature, the output water temperature and the supply air temperature output to the building and transferring these values to an optimization system to calculate the efficiency profile of the heating/cooling system, then cooperatively optimizing and selecting those values to provide the highest efficiency profile.

As a further example, U.S. Patent Application Publication No. 2012/0259469 by Ward, et al., entitled "HVAC Control System and Method", describes a method of controlling the HVAC system of a building. The system utilizes the thermal model of the building to continuously plan a daily HVAC operating schedule for the building. The thermal model uses a series of parameters fitted to historical thermal data for the building. The daily operating plan is an optimization of a combination of operator preferences that includes user comfort, power consumption and power costs. External inputs that can affect the operating plan include electricity pricing data, weather forecasts and occupant comfort satisfaction data. The human comfort model is augmented by means of data feedback by users of the building.

As a final example, U.S. Patent Application Publication No. 2014/0148953 by Nwankpa, et al., entitled "Dynamic Load Modeling of A Building's Energy Consumption for Demand Response Applications", describes a dynamic electrical load model for a HVAC chiller for use in demand response applications. A dynamic model accurately models the electrical energy consumption of a HVAC chiller in response to changes in building temperature control, i.e., via thermostat. Raising or lowering the outlet chilled water temperature is the action used to increase or decrease the electric power, and for demand side response.

While addressing important areas of building energy use optimization by using techniques like building energy modeling, control set point optimization, and model predictive control, one problem with existing methods and systems for building HVAC control such as those described in the above examples, is that they do not provide the degree of granular thermal zone-level comfort control, while optimizing overall energy use, that is required for today's buildings and networks of buildings.

A need therefore exists for an improved method and system for predictive building control for optimizing energy use and thermal comfort for a building or network of buildings. Accordingly, a solution that addresses, at least in part, the above and other shortcomings is desired.

SUMMARY OF THE INVENTION

According to one aspect of the invention, there is provided a method for controlling temperature in a thermal zone within a building, comprising: using a processor, receiving a desired temperature range for the thermal zone; determining a forecast ambient temperature value for an external surface of the building proximate the thermal zone; using a predictive model for the building, determining set points for a heating, ventilating, and air conditioning ("HVAC") system associated with the thermal zone that minimize energy use by the building; the desired temperature range and the forecast ambient temperature value being inputs to the predictive model; the predictive model being trained using respective historical measured value data for at least one of the inputs; and, controlling the HVAC system with the set points to maintain an actual temperature value of the thermal zone within the desired temperature range for the thermal zone.

In accordance with further aspects of the invention, there is provided an apparatus such as a data processing system, a predictive building control system, a building energy management system, etc., a method for adapting these, as well as articles of manufacture such as a computer readable medium or product and computer program product or software product (e.g., comprising a non-transitory medium) having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF EXAMPLE EMBODIMENTS

In the following description, details are set forth to provide an understanding of the invention. In some instances, certain software, circuits, structures and methods have not been described or shown in detail in order not to obscure the invention. The term "data processing system" or "system" is used herein to refer to any machine for processing data, including the predictive building control systems, building energy management systems, utility demand response control systems, control systems, controllers, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

As described further below, according to one embodiment of the present invention, there is provided a method and system for predictive building control which optimizes individual thermal zone comfort by taking into account individual thermodynamics of thermal zones and different weather impacts on the external surfaces or faces of each zone of a building. According to the present invention, in terms of granularity of building representation, an individual building is treated as having more than a single thermal zone, expected weather conditions at the building faces of different thermal zones are considered, and as such zone-specific thermal comfort in individual thermal zones is improved as is overall optimal building energy performance. Also according to the present invention, in terms of building modeling, generic statistical modeling methods are used to determine overall building energy consumption when dealing with various building characteristics and climate zones. The modeling methods used address thermal response modeling for each individual zone in a building. Also according to the present invention, in terms of optimization of building thermal comfort while minimizing building energy use and costs, an optimization strategy and methods are provided for finding the best or optimal solution for an optimization function while meeting various constraints.

Figure 12:
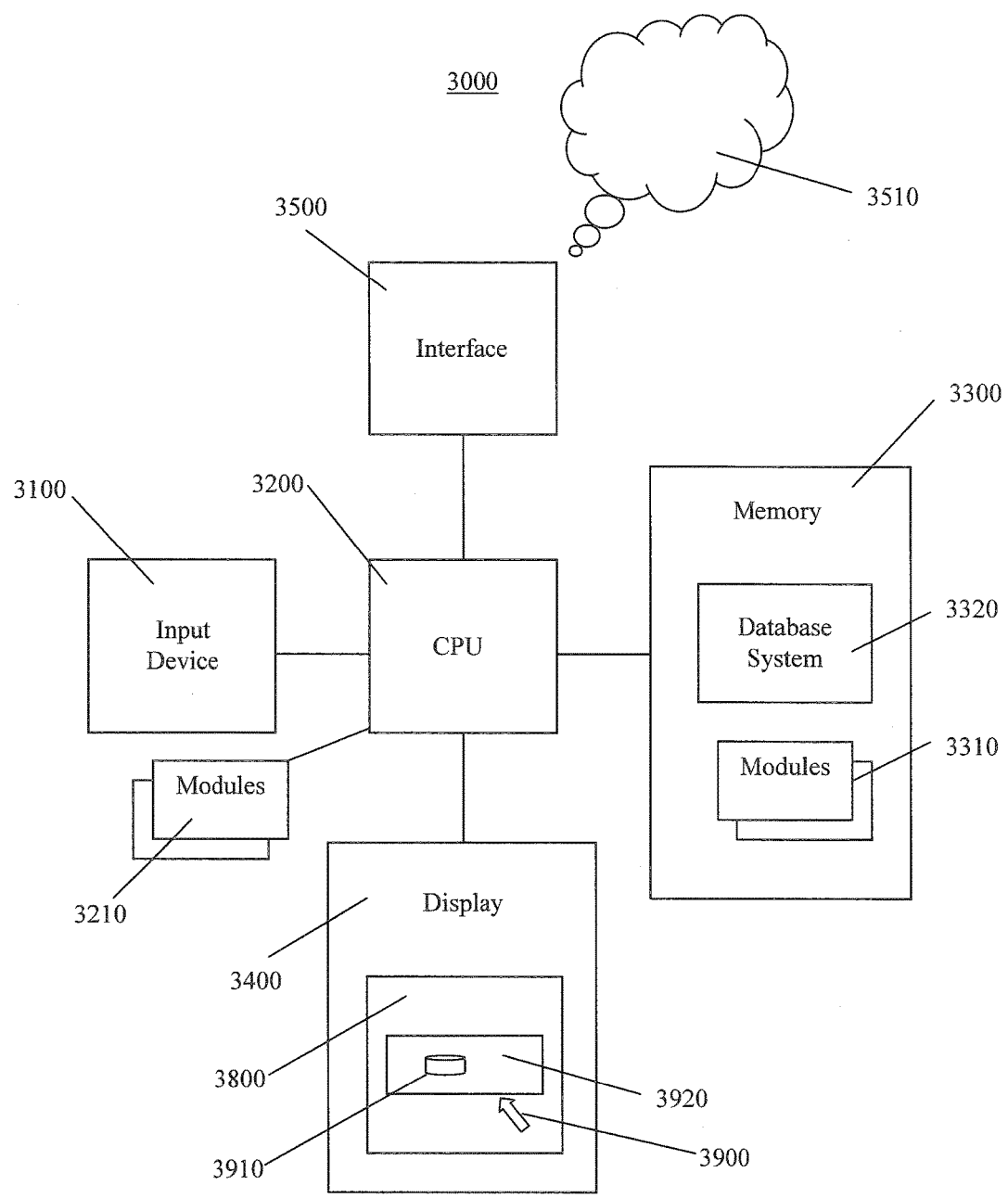
FIG. 12 is a block diagram illustrating a data processing system in accordance with an embodiment of the invention.

FIG. 12 is a block diagram illustrating a data processing system 3000 in accordance with an embodiment of the invention. The data processing system 3000 is suitable for performing as a control system, control device, controller, programmable logic controller ("PLC"), supervisory control and data acquisition ("SCADA") system, energy management system ("EMS"), predictive building control system 230, building energy management system 150, utility demand response control system 400, or the like. The data processing system 3000 is also suitable for data processing, management, storage, and for generating, displaying, and adjusting presentations in conjunction with a user interface or a graphical user interface ("GUI"), as described below. The data processing system 3000 may be a client and/or server in a client/server system. For example, the data processing system 3000 may be a server system or a personal computer ("PC") system. The data processing system 3000 may also be a distributed system which is deployed across multiple processors. The data processing system 3000 may also be a virtual machine. The data processing system 3000 includes an input device 3100, at least one central processing unit ("CPU") 3200, memory 3300, a display 3400, and an interface device 3500. The input device 3100 may include a keyboard, a mouse, a trackball, a touch sensitive surface or screen, a position tracking device, an eye tracking device, or a similar device. The display 3400 may include a computer screen, television screen, display screen, terminal device, a touch sensitive display surface or screen, or a hardcopy producing output device such as a printer or plotter. The memory 3300 may include a variety of storage devices including internal memory and external mass storage typically arranged in a hierarchy of storage as understood by those skilled in the art. For example, the memory 3300 may include databases, random access memory ("RAM"), read-only memory ("ROM"), flash memory, and/or disk devices. The interface device 3500 may include one or more network connections. The data processing system 3000 may be adapted for communicating with other data processing systems (e.g., similar to the data processing system 3000) over a network 3510 via the interface device 3500. For example, the interface device 3500 may include an interface to a network 3510 such as the Internet and/or another wired or wireless network (e.g., a wireless local area network ("WLAN"), a cellular telephone network, etc.). As such, the interface 3500 may include suitable transmitters, receivers, antennae, etc. Thus, the data processing system 3000 may be linked to other data processing systems by the network 3510. In addition, the interface device 3500 may include one or more input and output connections or points for connecting various sensors 170, status (indication) inputs, analog (measured value) inputs, counter inputs, analog outputs, and control outputs to the data processing system 3000. The CPU 3200 may include or be operatively coupled to dedicated coprocessors, memory devices, or other hardware modules 3210. The CPU 3200 is operatively coupled to the memory 3300 which stores an operating system (e.g., 3310) for general management of the system 3000. The CPU 3200 is operatively coupled to the input device 3100 for receiving user commands or queries and for displaying the results of these commands or queries to the user on the display 3400. Commands and queries may also be received via the interface device 3500 and results may be transmitted via the interface device 3500. The data processing system 3000 may include a data store or database system 3320 for storing data and programming information. The database system 3320 may include a database management system (e.g., 3320) and a database (e.g., 3320) and may be stored in the memory 3300 of the data processing system 3000. In general, the data processing system 3000 has stored therein data representing sequences of instructions which when executed cause the method described herein to be performed. Of course, the data processing system 3000 may contain additional software and hardware a description of which is not necessary for understanding the invention.

Thus, the data processing system 3000 includes computer executable programmed instructions for directing the system 3000 to implement the embodiments of the present invention. The programmed instructions may be embodied in one or more hardware modules 3210 or software modules 3310 resident in the memory 3300 of the data processing system 3000 or elsewhere (e.g., 3200). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 3300 of the data processing system 3000. Alternatively, the programmed instructions may be embedded in a computer-readable signal or signal-bearing medium or product that is uploaded to a network 3510 by a vendor or supplier of the programmed instructions, and this signal or signal-bearing medium or product may be downloaded through an interface (e.g., 3500) to the data processing system 3000 from the network 3510 by end users or potential buyers.

A user may interact with the data processing system 3000 and its hardware and software modules 3210, 3310 using a user interface such as a graphical user interface ("GUI") 3800 (and related modules 3210, 3310). The GUI 3800 may be used for monitoring, managing, and accessing the data processing system 3000. GUIs are supported by common operating systems and provide a display format which enables a user to choose commands, execute application programs, manage computer files, and perform other functions by selecting pictorial representations known as icons, or items from a menu through use of an input device 3100 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 3800 presented on a display 3400 by using an input device (e.g., a mouse) 3100 to position a pointer or cursor 3900 over an object (e.g., an icon) 3910 and by selecting or "clicking" on the object 3910. Typically, a GUI based system presents application, system status, and other information to the user in one or more "windows" appearing on the display 3400. A window 3920 is a more or less rectangular area within the display 3400 in which a user may view an application or a document. Such a window 3920 may be open, closed, displayed full screen, reduced to an icon, increased or reduced in size, or moved to different areas of the display 3400. Multiple windows may be displayed simultaneously, such as: windows included within other windows, windows overlapping other windows, or windows tiled within the display area.

Figure 14:
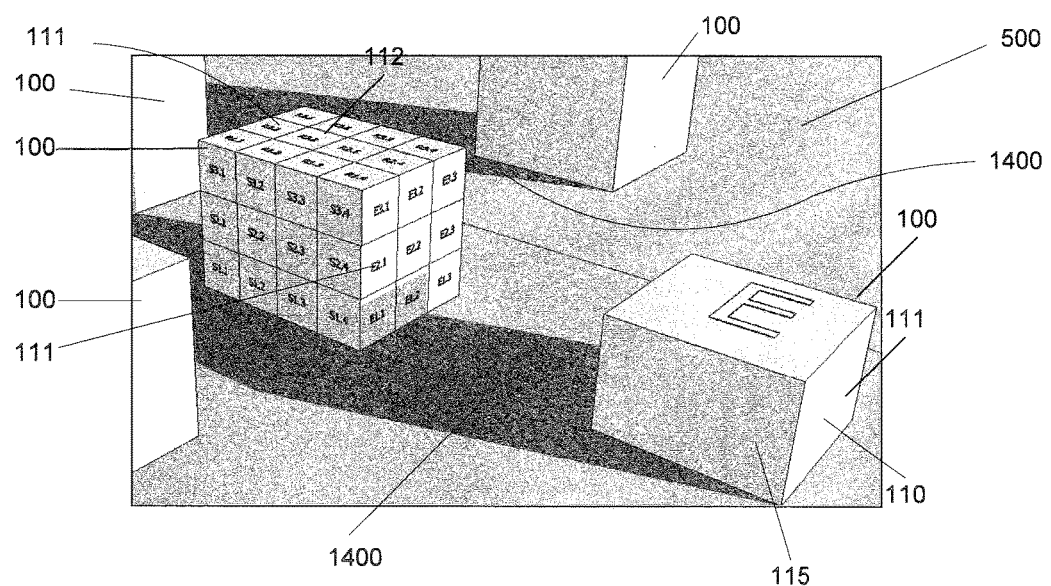
FIG. 14 is a perspective view illustrating a network of buildings in accordance with an embodiment of the invention.
Figure 16:
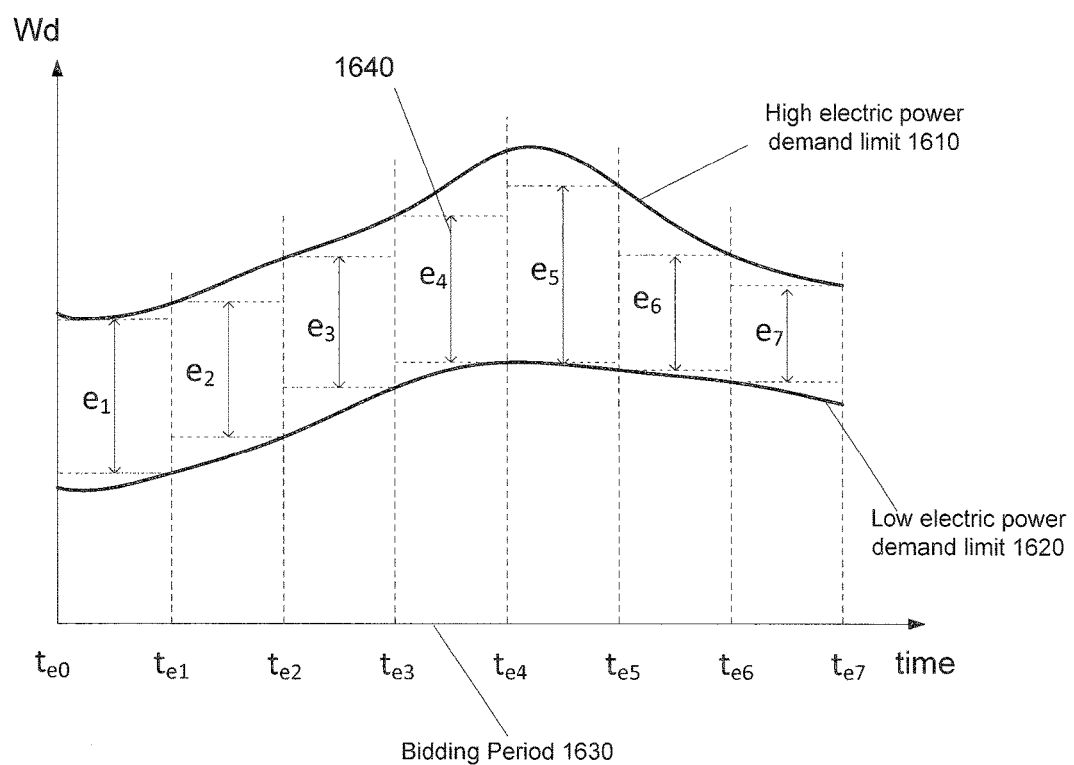

FIG. 14 is a perspective view illustrating a network of buildings 500 in accordance with an embodiment of the invention. And, FIG. 16 is a graph illustrating electric power demand WI for a building 100 or network of buildings 500 in accordance with an embodiment of the invention. The network of buildings 500 includes one or more buildings 100. The buildings 100 may be spaced apart and the space between buildings 100 may be referred to as a canyon 1400. Each building 100 has a building envelope 110 which includes the outer surface of the building 100. The building envelope 110 may include one or more external surfaces 111. Each building 100 or envelope 110 may include therein one or more building thermal zones 115. Each thermal zone 115 may be associated with or proximate to a respective external surface 111 of the building 100. The temperature within the thermal zone 115 is affected by the ambient temperature, solar irradiance, and wind speed and direction at the external surface 111. In addition, each external surface 111 may be subdivided into one or more cells 112. The building 100 or network of buildings 500 may have an electric power demand $W_d$ as shown in FIG. 16.

Figure 1:
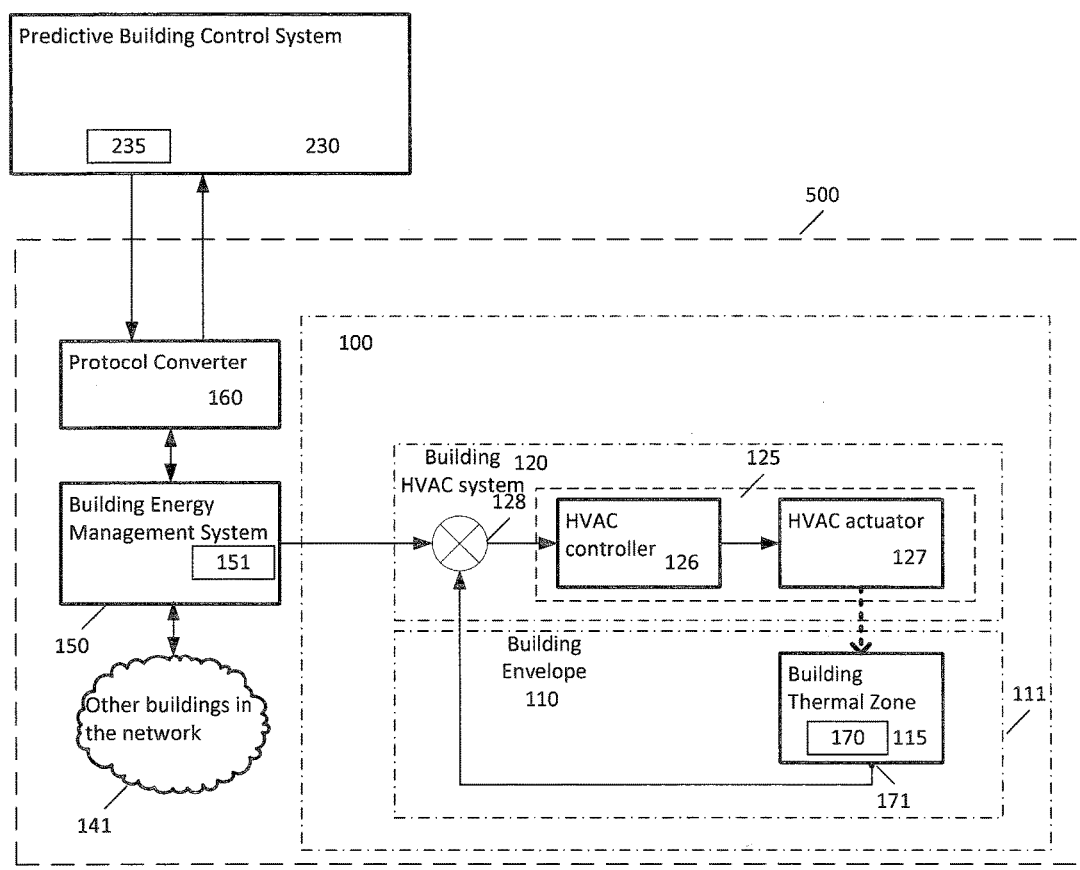
FIG. 1 is a block diagram illustrating a predictive building control system for a building or network of buildings in accordance with an embodiment of the invention.

FIG. 1 is a block diagram illustrating a predictive building control system 230 for a building 100 or network of buildings 500 in accordance with an embodiment of the invention. The network of buildings 500 has associated therewith a building energy management system ("BEMS") 150 which provides supervisory control, monitoring of building energy performance, and related data collection functions including data and readings from energy consumption meters and sensors for all buildings 100, 141 in the network 500. In FIG. 1, only one building 100 in the network of buildings 500 is shown in detail with the other buildings in the network and related structure being represented by reference numeral 141. It will be understood by those skilled in the art that the network of building 500 may include a plurality of buildings 100 located in the same geographic area or in different geographic areas, may be connected to the same power utility grid or to different utility grids, and may obtain fuels from one fuel vendor or from many vendors, and the like. It will be also understood by those skilled in the art that all buildings 100 in the network of buildings 500 are connected (e.g., communicatively coupled over a network 3510) to the same building energy management system 150.

Each building 100 includes a heating, ventilating, and air conditioning ("HVAC") system 120. Thermal conditions in each thermal zone 115 are controlled using thermal control parameters that include the zone temperature, relative humidity, and air quality. Thermal conditions within thermal zones 115 are maintained by the building's HVAC system 120. It will be further understood by those skilled in the art that the building's HVAC system 120 may include one or more HVAC devices 125 and each of the thermal zones 115 may be served by one or more HVAC devices 125. Note that while only one HVAC device 125 is shown in FIG. 1, it will be understood by those skilled in the art that a plurality of HVAC devices 125 may be used.

Each HVAC device 125 includes a local HVAC controller 126 and a HVAC actuator 127. The HVAC actuator 127 may be coupled to a motor based device such as a fan, a valve, a pump, or other similar device. The local HVAC controller 126 receives control parameters (e.g., thermal zone temperature reference values, air flow rate reference values, etc.) in the form of digital reference values and translates these digital reference values into electric control signals that are used to drive the HVAC actuator 127.

The building energy management system 150 is connected (e.g., communicatively coupled over a network 3510) to the HVAC system 120 to schedule and monitor its operations. Specifically, the building energy management system 150 sends supervisory control signals and reference set points 151 to the local HVAC controller 126 of the HVAC device 125 for establishing the HVAC device's schedule and mode of operation. Normally, reference set points 151 are predefined in the building energy management system 150 by a building operator or user via the building energy management system's human machine interface or GUI 3800 as required on a daily, monthly, or seasonal basis. These reference set points 151 may be automatically sent to the local controller 126 of the HVAC system 120. It will be understood by those skilled in the art that HVAC device schedules may be modified at any time by authorized building operators or users. The execution of the set points results in a change in the control parameters for a thermal zone 115 (e.g., the zone temperature).

At least one sensor 170 installed in the thermal zone 115 measures the actual values 171 of the control parameters for comparison to the reference values specified as reference set points 151. Usually, at least one of the control parameters is measured, such as the zone temperature. The deviation or difference between the reference values and the actual measured values 171 is fed back by a feed-back loop or system 128 to the local HVAC controller 126. The local HVAC controller 126 remains active in sending control signals to the HVAC actuator 127 until the actual value 171 as measured by the sensor 170 is identical (or approximately identical) to the respective reference set point value 151 provided by the building energy management system 150.

The building energy management system 150 is coupled (e.g., communicatively coupled over a network 3510) through a protocol converter 160 to a predictive building control system 230. The predictive building control system 230 operates as a supervisory control and data acquisition ("SCADA") system and provides to the building energy management system 150 optimized set points 235 for individual building thermal zones 115 based on anticipated changes in ambient weather conditions, building occupancy, internal load, fuel costs, etc., to achieve minimum overall building energy consumption and to ensure comfort in each thermal zone 115.

The predictive building control system 230 optimizes set points for the HVAC system 120 for at least one key control parameter such as thermal zone temperature. The "optimal" set points 235 enable the building's HVAC system 120 to provide guaranteed or near guaranteed occupant comfort with minimum or near minimum energy consumption and/or cost. The optimal set points 235 are calculated by taking into account at least one source of predictive data, such as weather forecasts, occupancy and internal load estimates, fuel cost forecasts, and/or other predictive data. The optimal set points 235 received by the building energy management system 150 over-write or over-ride the default or reference set points 151 for the building thermal zones 115 stored in the building energy management system 150, and are used by the building energy management system 150 to supervise the performance of the HVAC system 120. The predictive building control system 230 also collects and stores real-time operating data from the building energy management system 150.

The protocol converter 160 is used to convert a standard or proprietary data transmission protocol (e.g., as used by the predictive building control system 230) to a protocol suitable for or used by the building energy management system 150 to enable its interoperability with the predictive building control system 230. The protocol converter 160 enables the connection (e.g., communicative coupling over a network 3510) of the building energy management system 150 to external systems and devices for improving energy performance of the buildings 100 in the network of buildings 500. It will be understood by those skilled in the art that the protocol converter 160 may be coupled to the building energy management system 150 via wired or wireless communications means such as by an intranet network 3510 of the building energy management system 150.

Figure 1A:
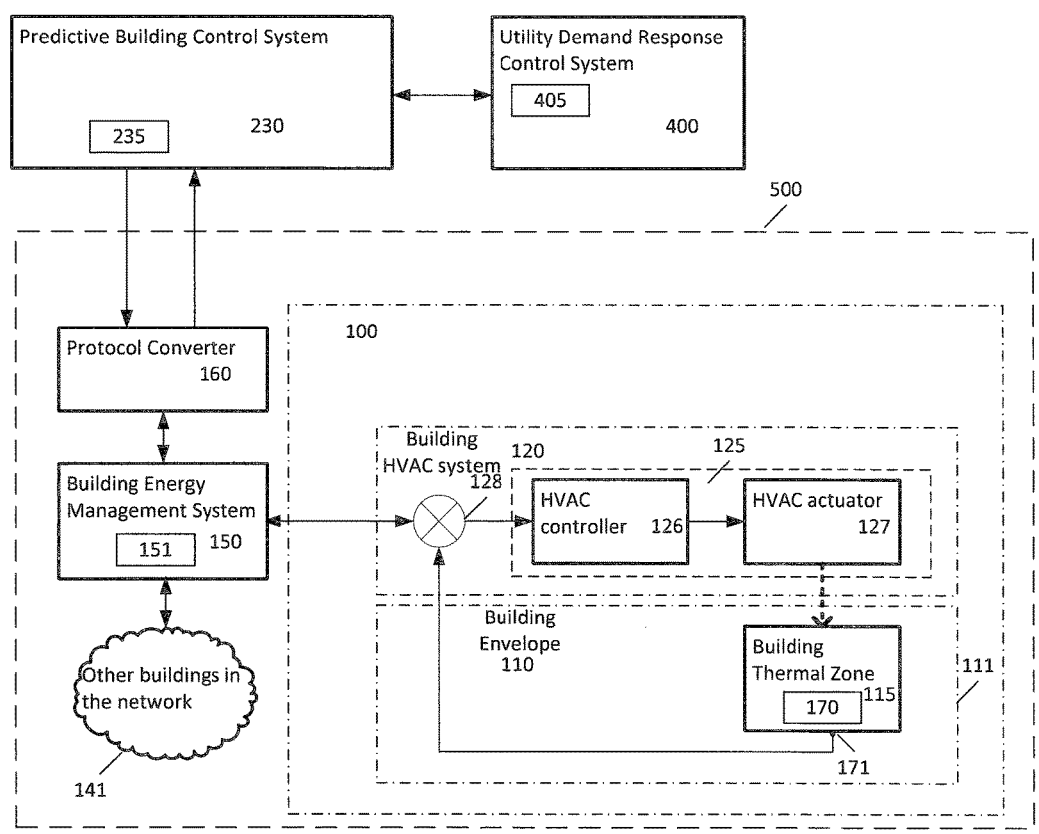
FIG. 1A is a block diagram illustrating a predictive building control system for a building or network of buildings in accordance with another embodiment of the invention.

FIG. 1A is a block diagram illustrating a predictive building control system 230 for a building 100 or network of buildings 500 in accordance with another embodiment of the invention. In FIG. 1A, the predictive building control system 230 is coupled to at least one utility demand response control system 400 which provides at least one demand response signal 405 (e.g., containing a demand response command, condition, information, etc.). The predictive building control system 230 is adapted to determine optimal set points 235 for the building energy management system 150 at least partially based on the at least one demand response signal 405 provided by the utility demand response control system 400. Since the use of electric power in the building 100 depends on the optimal set points 235 provided by the predictive building control system 230, the optimality of the set points 235 output by the predictive building control system 230 may be improved by taking into account the demand response signals 405 for the building 100.

For example, and referring again to FIG. 16, electric power markets may support the hourly or sub-hourly bidding of demand response assets (e.g., for frequency response applications, etc.). The predictive building control system 230 may define the range of electric power demand for HVAC and controllable internal building loads for any period within a forecast horizon required to satisfy building comfort requirements. This range may be used as a demand response asset to bid into an electric power market. In this case, the predictive building control system 230 will provide high and low electric power demand values or limits 1610, 1620 corresponding to the lower and higher limits 6022, 6021 of a desired temperature range 602 for the thermal zone 115 (see FIG. 5) (or vise versa depending on whether electric heating or cooling is required). The difference 1640 between the high and low electric power demand limits 1610, 1620, or portion thereof, may be bid into available electric power markets for a predetermined (e.g., for the utility) period of time (e.g., 1630). During this time, the utility demand response control system 400 will provide demand response signals 405 to change the building's electric power demand between the high and low demand limits 1610, 1620 as required by operating conditions in the utility grid. According to one embodiment, the difference 1640 may be determined as the difference between the lowest value of the high electric power demand limit 1610 and the highest value of the low electric power demand limit 1620 within the predetermined period of time (e.g., 1630). Calculating the difference 1640 in this way will help prevent violation of building comfort requirements during this period of time 1630. Note that other ways of determining the difference 1640 may also be used. The predictive building control system 230 may also optimize the bidding capacity 1640 based on an ancillary services price in the market, current electricity price, etc., to maximize the overall savings either by increasing demand response related revenue or reducing electric power costs. For example, in a bidding period 1630 when the frequency regulation market price is high, the maximum possible bidding capacity will be used. Otherwise, when the demand response price is low, HVAC operations will be optimized to use minimum electric power while remaining within the thermal comfort range.

Figure 1B:
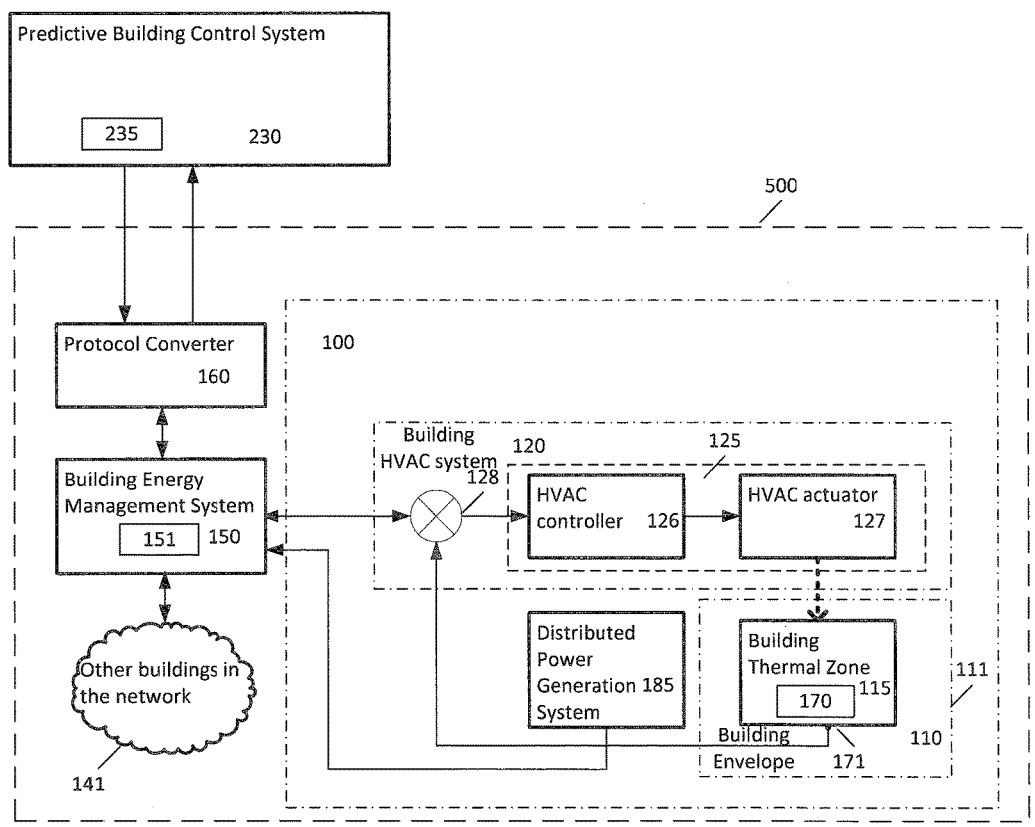
FIG. 1B is a block diagram illustrating a predictive building control system for a building or network of buildings in accordance with another embodiment of the invention.

FIG. 1B is a block diagram illustrating a predictive building control system 230 for a building 100 or network of buildings 500 in accordance with another embodiment of the invention. In FIG. 1B, the building 100 includes at least one distributed power generation system 185 such as a solar photovoltaic or wind power system. Data relating to electric power generated by the distributed power generation system 185 is provided to the building energy management system 150. The predictive building control system 230 is adapted to determine optimal set points 235 for the building energy management system 150 at least partially based on a forecast power output of the distributed power generation system 185. Since the use of electric power by the building 100 depends on the optimal set points 235 provided by the predictive building control system 230, the optimality of the set points 235 output by the predictive building control system 230 may be improved by taking into account the forecast power output by the distributed power generation system 185 to maximize the use of electric power produced by this system 185 and to minimize the purchase of electric power from an electric power utility. For example, the predictive building control system 230 may provide set points 235 that will match the anticipated schedule of electric power demand by the building 100 (e.g., as received from the electric power utility) with the anticipated schedule of electric power generation by the distributed power generation system 185 thus minimizing the overall electric power costs for the building 100.

Figure 1C:
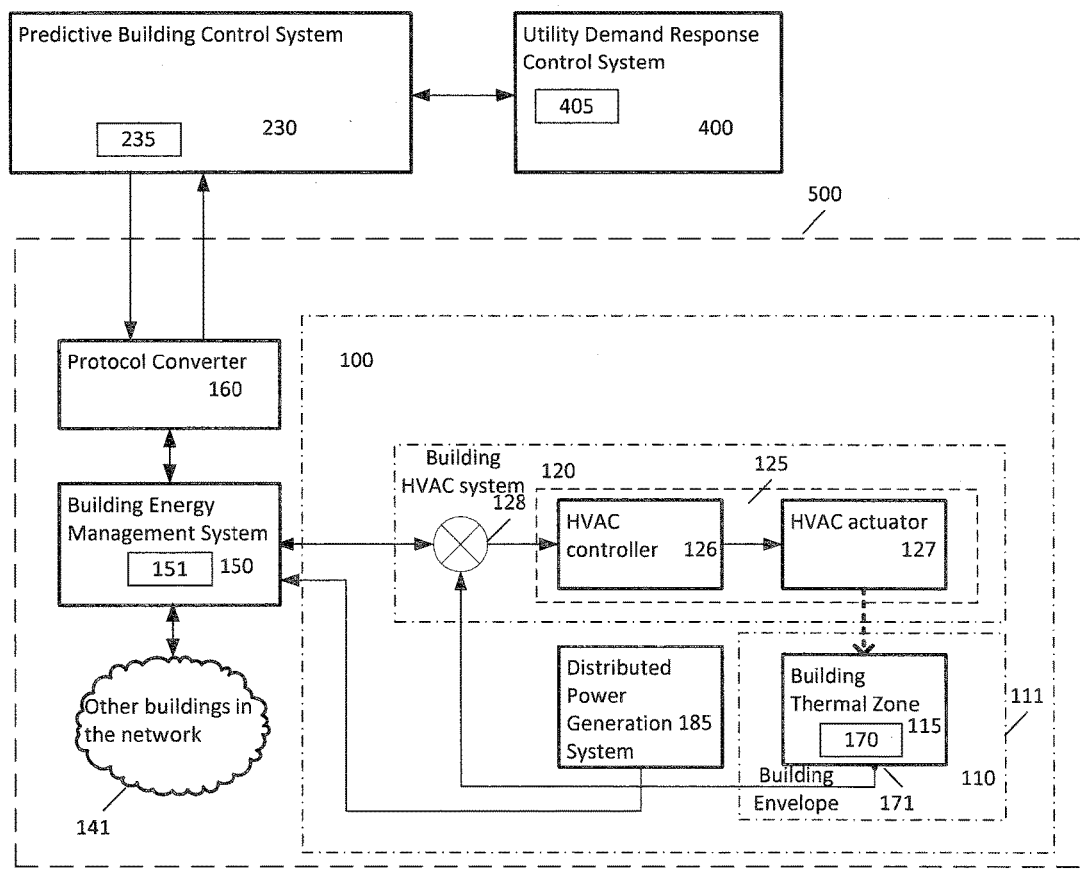
FIG. 1C is a block diagram illustrating a predictive building control system for a building or network of buildings in accordance with another embodiment of the invention.

FIG. 1C is a block diagram illustrating a predictive building control system 230 for a building 100 or network of buildings 500 in accordance with another embodiment of the invention. In FIG. 1C, the building 100 includes at least one distributed power generation system 185 such as a solar photovoltaic or wind power system. Data relating to electric power generated by the distributed power generation system 185 is provided to the building energy management system 150. The predictive building control system 230 is adapted to determine optimal set points 235 for the building energy management system 150 at least partially based on at least one demand response signal 405 provided by the utility demand response control system 400 and on a forecast power output of the distributed power generation system 185. Since the use of electric power by the building 100 depends on the optimal set points 235 provided by the predictive building control system 230, the optimality of the set points 235 output by the predictive building control system 230 may be improved by taking into account the demand response signals 405 for the building 100 and the forecast electric power generated by the distributed power generation system 185. For example, the predictive building control system 230 may provide electric power demand values 1610, 1620 corresponding to the higher and lower limits 6021, 6022 of a desired temperature range 602 for the thermal zone 115. The difference 1640 between the high and low electric power demand limits 1610, 1620, or portion thereof, that incorporates the forecast electric power generated by the distributed power generation system 185 may be bid into available electric power markets for a predetermined (e.g., for the utility) period of time (e.g., 1630). During this time 1630, the utility demand response control system 400 will provide demand response signals 405 to change the building's electric power demand between the high and low demand limits 1610, 1620 as required by operating conditions in the utility grid.

Figure 1D:
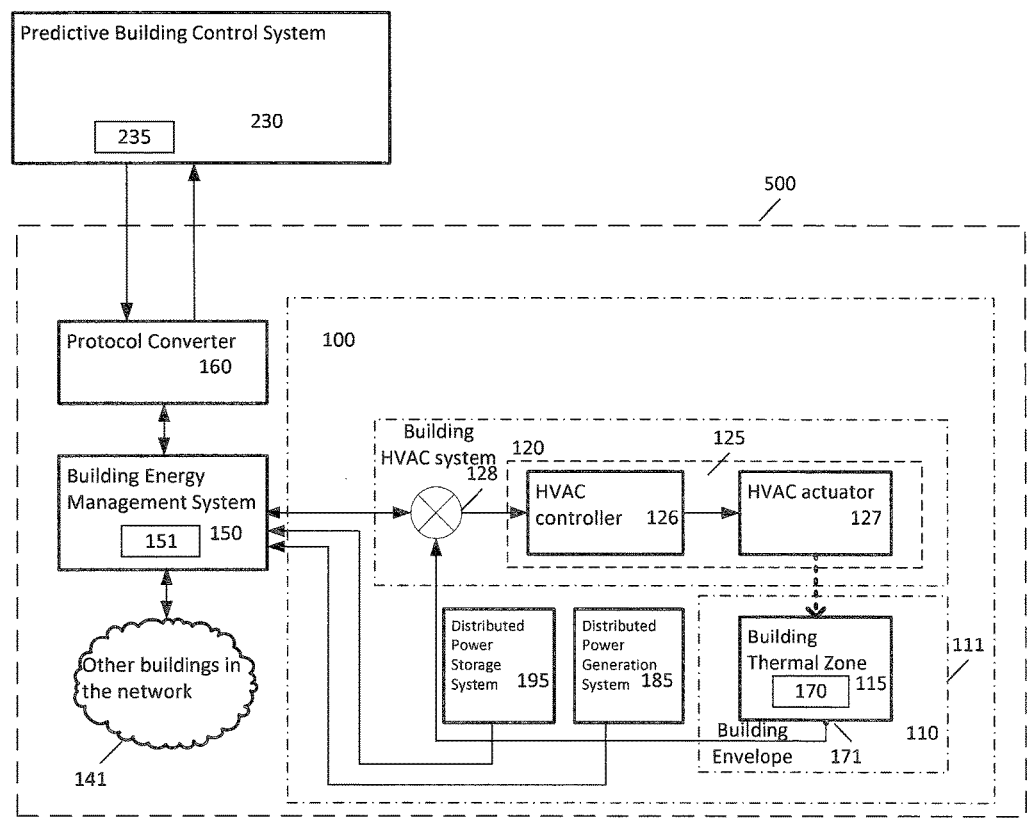
FIG. 1D is a block diagram illustrating a predictive building control system for a building or network of buildings in accordance with another embodiment of the invention.

FIG. 1D is a block diagram illustrating a predictive building control system 230 for a building 100 or network of buildings 500 in accordance with another embodiment of the invention. In FIG. 1D, the building 100 includes at least one distributed power storage system 195. The predictive building control system 230 is adapted to determine optimal set points 235 for the building energy management system 150 at least partially based on the forecast power output of the distributed power system 185 and the forecast power output of the distributed power storage system 195. Since the use of electric power by the building 100 depends on the optimal set points 235 provided by the predictive building control system 230, the optimality of the set points 235 output by the predictive building control system 230 may be improved by taking into account the forecast power output by the distributed power generation system 185 and the distributed power storage system 195 to maximize the use of electric power produced by these systems 185, 195 and to minimize the purchase of electric power from an electric power utility. For example, the predictive building control system 230 may provide set points 235 that will match the anticipated schedule of electric power demand by the building 100 (as received from the electric power utility) with the anticipated schedule of electric power generation by the distributed power system 185 and the electric power output from the distributed power storage system 195 thus minimizing the overall electric power costs for the building 100.

Figure 1E:
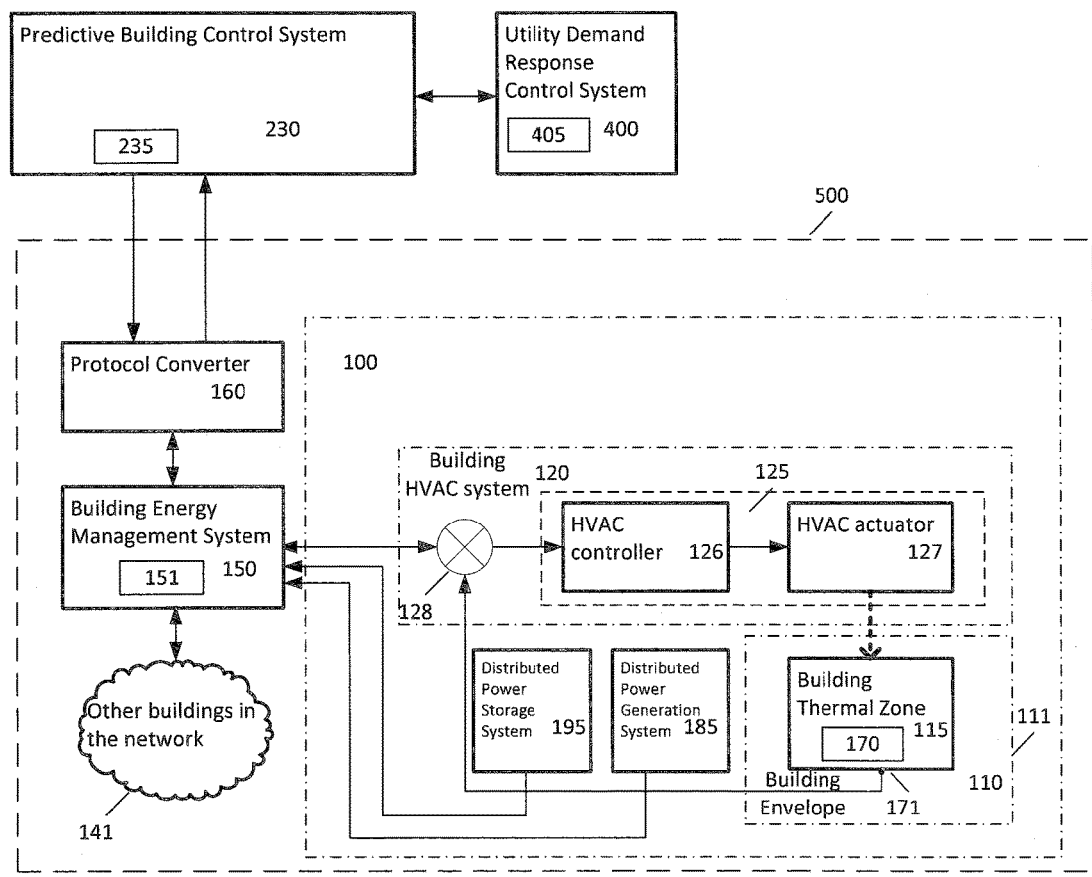
FIG. 1E is a block diagram illustrating a predictive building control system for a building or network of buildings in accordance with another embodiment of the invention.

FIG. 1E is a block diagram illustrating a predictive building control system 230 for a building 100 or network of buildings 500 in accordance with another embodiment of the invention. In FIG. 1E, the predictive building control system 230 is coupled to at least one utility demand response control system 400 which provides at least one demand response signal 405. The predictive building control system 230 is adapted to determine optimal set points 235 for the building energy management system 150 at least partially based on the at least one demand response signal 405 provided by the utility demand response control system 400, the forecast power output of the distributed power generation system 185, and the forecast power output of the distributed power storage system 195. Since the use of electric power by the building 100 depends on the optimal set points 235 provided by the predictive building control system 230, the optimality of the set points 235 output by the predictive building control system 230 may be improved by taking into account the demand response signals 405 for the building 100, the forecast electric power generated by the distributed power system 185, and the forecast electric power output from the distributed power storage system 195. For example, the predictive building control system 230 may provide electric power demand values 1610, 1620 corresponding to the higher and lower limits 6021, 6022 of a desired temperature range 602 for the thermal zone 115. The difference 1640 between the high and low electric power demand limits 1610, 1620, or portion thereof, that incorporates the forecast electric power generated by the distributed power generation system 185 and the forecast electric power output from the distributed power storage system 195 may be bid into available electric power markets for a predetermined (e.g., for the utility) period of time (e.g., 1630). During this time 1630, the utility demand response control system 400 will provide demand response signals 405 to change the building's electric power demand between the high and low demand limits 1610, 1620 as required by operating conditions in the utility grid.

Figure 1F:
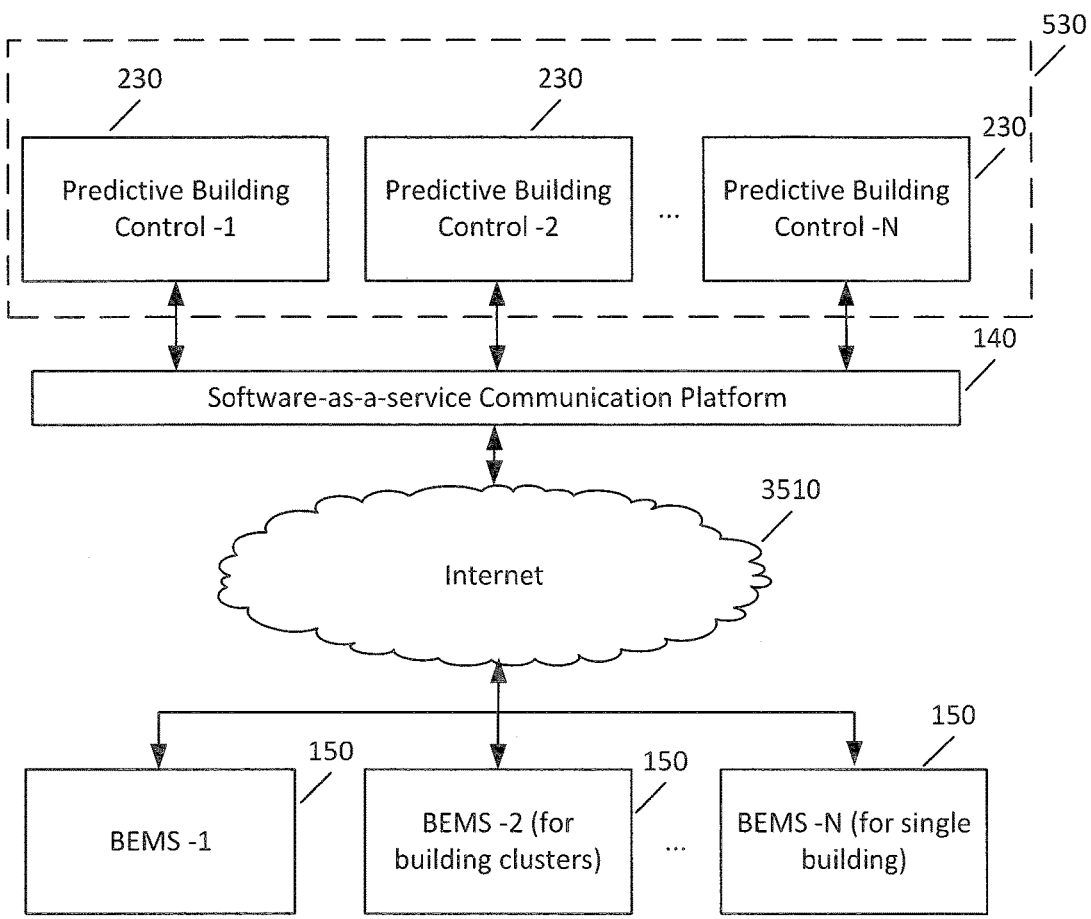
FIG. 1F is a block diagram illustrating a predictive building control engine for multiple networks of buildings in accordance with an embodiment of the invention.

FIG. 1F is a block diagram illustrating a predictive building control engine 530 for multiple networks of buildings 500 in accordance with an embodiment of the invention. In FIG. 1F, a predictive building control engine 530 provides software-as-a-service via a software-as-a-service communication platform 140 for multiple networks of buildings 500. Each network of buildings 500 has a dedicated predictive building control system 230 which is established on the predictive building control engine 530. Each predictive building control system 230 provides optimal set points 235 to its network of buildings 500 via a building energy management system 150 dedicated to the network. The building energy management systems 150 implement the optimal set points 235 by sending them to respective building HVAC systems 120. The software-as-a-service communication platform 140 manages data exchange and data storage for the predictive building control engine 530. Internet infrastructure 3510 may be used for data communications between the predictive building control engine 530 and the building energy management systems 150.

Figure 2:
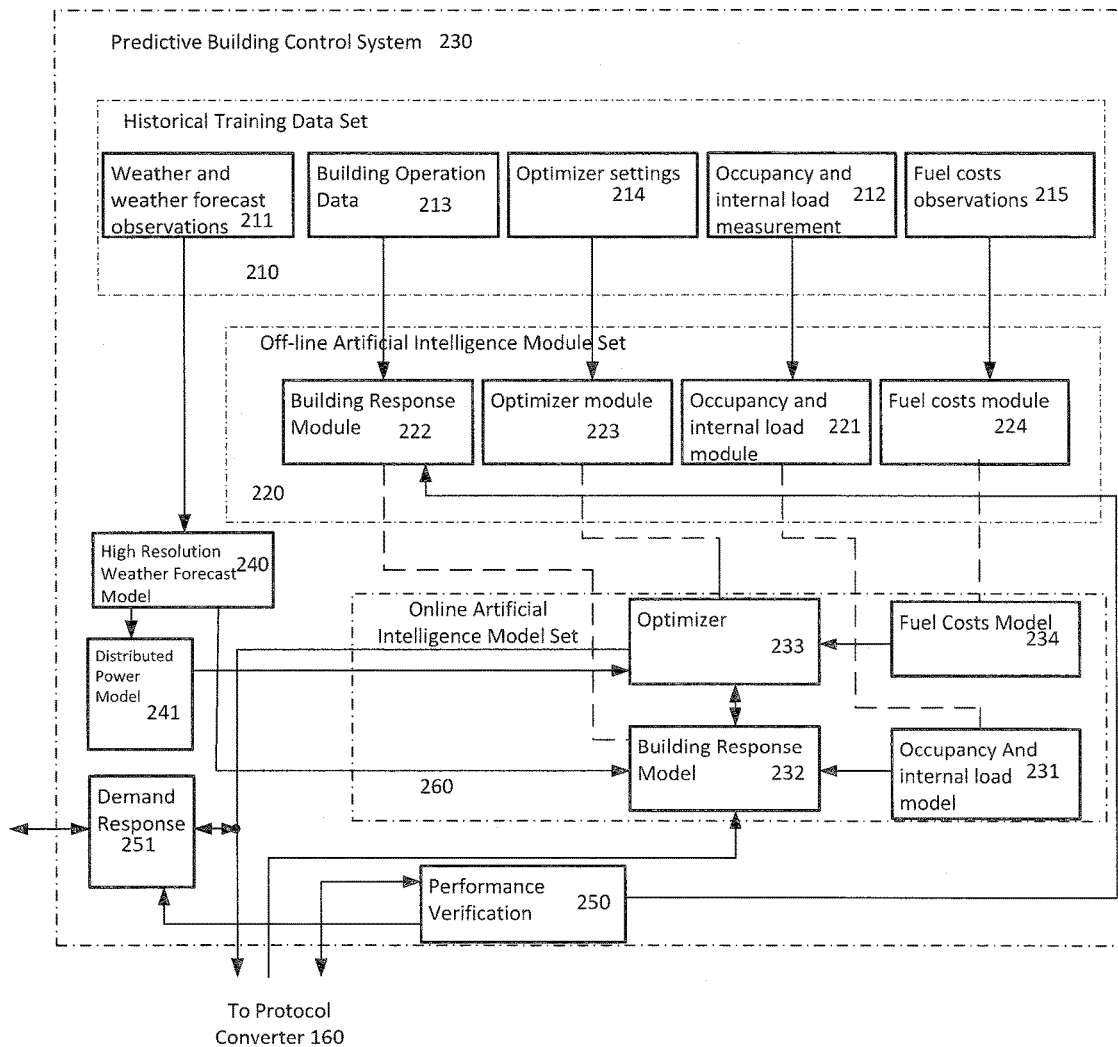
FIG. 2 is a block diagram illustrating components of a predictive building control system in accordance with an embodiment of the invention.

FIG. 2 is a block diagram illustrating components of a predictive building control system 230 in accordance with an embodiment of the invention. The predictive building control system 230 includes the following components: a high resolution weather forecasting model 240, an online artificial intelligence model set 260, an off-line artificial intelligence module set 220, a historical training data set 210, a performance verification module 250, a distributed power forecasting model 241, and a demand response module 251. The term "model" in the online artificial intelligence model set 260 is related to a "black box" statistical model trained by one of the "modules" in the off-line artificial intelligence module set 220. The trained "model" files are in the format of binary files which contain the key modeling parameters depending on linear and nonlinear black-box model structures (e.g., a linear coefficient if linear fitting is chosen, weights between different layers of neurons if artificial neural networks ("ANNs") are used, etc.). Modules in the off-line artificial intelligence module set 220 specify model structures and artificial intelligence-based training techniques as described below.

The online artificial intelligence model set 260 includes software models (e.g., implemented by software modules 3310) that are run in a real-time environment. The online artificial intelligence model set 260 includes or implements a building response model 232, an optimizer model 233, an occupancy and internal load model 231, and a fuel costs model 234.

The building response model 232, fuel costs model 234, and occupancy and internal load model 231 use black-box data mining techniques. Black-box models assume that the process to be modeled can be described accurately by input-output models in which the inputs are used as predictors and a set of input variables are mapped onto corresponding outputs after the models are properly trained.

The black-box models and their corresponding training modules may be designed as follows. First, system analysis is performed in order to formulate the goals and the requirements of a model and to determine the boundaries of the model. For example, the building response model 232 predicts the energy performance and thermal conditions in a building 100 based on external weather forecasts and building occupancy and internal load forecasts. The fuel costs model 224 predicts the future costs of energy sources used by the building's HVAC system 120. The occupancy and internal load forecasting model 231 predicts short term forecasts of the occupancy and internal load of the building 100 over a predetermined forecast horizon based on the use of the building 100.

Key independent variable analysis is used to determine the input and output variables. This step is based on expert insight into the physical system and on a sensitivity analysis such as a cross correlation calculation on historical data sets. The input and output variables for a model may be measured in real buildings and are generic being applicable to various buildings which have their own unique HVAC settings and construction characteristics.

Black-box modeling techniques including ANNs, regression trees, and support vector machines ("SVMs") determine nonlinear black-box model structures which may be used for representing non-linear dynamic input-output mapping relations for the building response model 232, the fuel costs model 234, and the occupancy and internal load model 231. As understood by those of skilled in the art, the principle of black-box modeling is typically a trial-and-error process in which the parameters of various structures are estimated and the results are compared to determine best fits. When a selection of a certain type of black-box model has been made, further choices have to be made with respect to handling model-order and non-linearity. Black-box modeling techniques vary in complexity (e.g., hidden layers for neural networks, the number of training cycles, etc.) depending on the flexibility of the model and the need to account for dynamics and noise with respect to the prediction.

The building response module 222, the occupancy and internal load module 221, and the fuel costs module 224 may use the following steps for black-box modeling. First, data preprocessing and conditioning. This first data conditioning step provides an indication as to whether there are points in the data sets which are abnormal, removes these bad points from data set, and fills the bad data section with good data points before passing to the module for training. Second, model identification. In this step, the model is fitted to the measured data. Usually, the error between the modeled and the actual output is minimized. The key parameters of the black-box model structure (e.g., ANN, regression tree, or SVM) are determined after this step. Third, model evaluation. In this step, the model is tested by means of special test data sets to determine whether the model has sufficient capacity to predict stationary and dynamic behavior. The black-box model is properly trained after the acceptance of assessment by applying accuracy metrics. Otherwise, a new training session starts by using new black-box model structure or new data sets.

The off-line artificial intelligence module set 220 includes artificial intelligence modules (e.g., implemented by software modules 3310) running off-line for training or configuring the online artificial intelligence model sets 260. The off-line artificial intelligence module set 220 includes a building response module 222, an optimizer module 223, an occupancy and internal load module 221, and a fuel costs module 224.

The historical training data set or layer 210 includes model training-associated data sets. It includes: weather and weather forecast observations data 211; building operations data 213; optimizer settings data 214; occupancy and internal load data 212; and, fuel costs observation data 215. It will be understood by those skilled in the art that the data sets may be organized as data tables in a database (e.g., 3320) or as data columns in data files (e.g., 3320).

Referring again to FIGS. 1-1F, the predictive building control system 230 is not necessarily co-located with the building energy management system 150 but may reside on its own server at another location. Note that FIG. 2 is intended to illustrate data flow logic and hence omits details relating to hardware infrastructure for data communications between the predictive building control system 230 and the building energy management system 150 (e.g., the Internet, various networks, etc.), such details being described above and illustrated in FIG. 12.

Referring again to FIG. 2, with respect to the online artificial intelligence model set or layer 260, the building response model 232 predicts the energy performance and thermal conditions for a building 100 based on external weather forecasts and building occupancy and internal load forecasts. The optimizer 233 searches for the "optimal" schedule of set points for a predetermined optimization horizon or period to minimize building energy consumption/cost within this horizon while satisfying thermal comfort requirements. The optimization horizon may be from 1 hour to 24 hours beyond a current time and may be divided into 15 minute time increments or intervals. It will be understood by those skilled in the art that the optimization horizon may be extended and that the time increments may be more or less granular. The optimizer 233 receives data from the building response model 232, the high resolution weather forecasting model 240, the occupancy and internal load model 231, and the fuel costs model 224 and uses the received data to determine optimal set points 235 and their schedule. These optimal set points 235 are then transmitted from the optimizer module 233 through the protocol converter 160 to the building energy management system 150 for the building 100.

The high resolution weather forecasting model 240 is a predictive weather analytics tool which produces short term (e.g., 0 to 24 hours ahead) weather forecasts over a forecast horizon for weather parameters at the building location and at the external faces or surfaces 111 of individual thermal zones 115 of the building 100. These weather parameters may include solar irradiance and its components (i.e., direct, diffuse, and reflected light), wind speed and direction, and temperature (e.g., dry bulb temperature). Optional weather parameters may include relative humidity and air pressure. The weather forecast horizon may be consistent with or aligned with the predictive building control system's optimization forecast horizon described above. The high resolution weather forecasting model 240 derives building face or surface 111 level weather parameters from lower resolution building site level weather parameters by using precise virtual modeling of the building envelope 110 and the surrounding built and natural environment including virtual shading analysis for each thermal zone face 111.

The fuel costs model 224 is a predictive market analytics tool which predicts the future costs of energy sources used by the building HVAC system 120. Those energy sources may include steam, natural gas, propane, oil, electricity, and the like. The forecast horizon of the fuel costs model 224 may be consistent with or aligned with the optimization forecast horizon described above.

The occupancy and internal load forecasting model 231 is a predictive occupancy and internal load analytics tool which produces short term forecasts of the occupancy and internal load of the building 100 over a predetermined forecast horizon based on the use of the building 100. The term "internal load" refers to heat gain from occupants (i.e., people) and electric devices such as computers, lighting, etc.

With respect to the off-line artificial intelligence module set 220, the building response module 222 uses artificial intelligence-based techniques (e.g., black box techniques, etc.) to train the building response model 232. The occupancy and internal load module 221 uses artificial intelligence-based techniques to train the occupancy and internal load model 231. And, the fuel costs module 224 uses artificial intelligence-based techniques to train the fuel costs model 234.

The optimizer module 223 reads the optimization settings from the optimizer settings data 214. These settings may include parameters such as the weights for energy costs and comfort components to be optimized and the time horizon over which the optimization is to be made. The weights are designed in accordance with preferences for energy costs or comfort. For example, if energy costs are more important than occupant comfort, the weight assigned to the energy costs component would be larger than the one assigned to the comfort component.

With respect to the historical training data set or layer 210, the building operations data 213 includes historical measured data for the inputs and outputs of the building response model 232, where the inputs refer to set points, ambient weather parameters, and occupancy and internal load data, and where the outputs refer to building energy consumption and zone temperature data. The occupancy and internal load measurement data 212 includes historical time-series data and occupancy statistics such as the number of occupants and the capacity of electric equipment for occupied hours of the building 100. The fuel costs observations data 215 includes historical time-series data for fuel prices. The weather and weather forecast observations data 211 includes data used by the high resolution weather forecasting model 240 for calibration purposes.

The performance verification module 250 provides performance validation and data output quality assurance for the predictive building control system 230. The performance verification module 250 runs a baseline model in real-time using the set points 235 provided by the optimizer 233 to calculate a baseline energy consumption value for the building 100. It then compares the resulting calculated baseline energy consumption of the building 100 with an observed or actual energy consumption value for the building 100. It will be understood by those skilled in the art that the baseline model is a standardized model reflecting the building's operations when set points 235 from the predictive building control system 230 are not provided to the building energy management system 150. If the actual energy consumption of the building 100 is lower than the baseline energy consumption by a predetermined amount or threshold, the performance verification module 250 automatically generates a signal to initiate retraining of the models running in the run-time environment 260. The off-line artificial intelligence module set 220 then retrieves the most recent observation data from the historical training data set 210 and trains new models to replace the models included in the online artificial intelligence model set 260. According to one embodiment, baseline energy consumption values are calculated from a calibrated building energy model. The "standardized" model means the accuracy of calibration is good enough to allow reasonable confidence based on industry standards (e.g., standards established by the American Society of Heating, Refrigerating and Air-Conditioning Engineers ("ASHRAE")). The calibrated building energy model is run using conventional set points in parallel with predictive building control ("PBC") operation. The actual energy consumption values collected from the building represent the energy performance enabled by using PBC. The difference between the baseline and actual energy consumption values indicates if PBC is saving energy or not. The yes/no answer triggers further action with respect to retraining the statistical models.

The demand response module 251 receives demand response signals 405 from the utility demand response control system 400 with respect to the building's electric power demand and transmits these signals 405 to the optimizer 233. The optimizer 233 generates set point schedules and related high and low electric power demand limits 1610, 1620, determines a portion (if any) 1640 to be bid into available electric power markets in the next bidding period, and transmits this information back to the utility demand response control system 400 via the demand response module 251.

In particular, the optimizer 233 generates set point schedules and related high and low electric power demand limits 1610, 1620 to ensure thermal comfort in the building 100. The demand response module 251 determines available bidding capacity 1640 as the difference between the lowest value of the high demand limit 1610 and the highest value of the low demand limit 1620 within the bidding period 1630 to guarantee that the thermal comfort range is not violated for each next bidding period (i.e., hourly, half-hourly, or of other duration established by the electric power market) towards the established forecast horizon, and bids this capacity 1640 or portion thereof for the next bidding period(s) into the electric power market by transmitting a bidding request to the utility demand response control system 400. The demand response module 251 receives the demand response signal 405 (e.g., a frequency response signal) requesting establishment of electricity demand within the range defined by the bidding capacity 1640, and transmits the signal 405 to the optimizer 233 which further calculates the set points schedule 235 to meet the HVAC and internal load demands as required by the utility.

Finally, the distributed power forecasting model 241 provides forecasts of power output from the distributed power generation system 185 and/or the distributed power storage system 195 to the optimizer 233.

Figure 15:
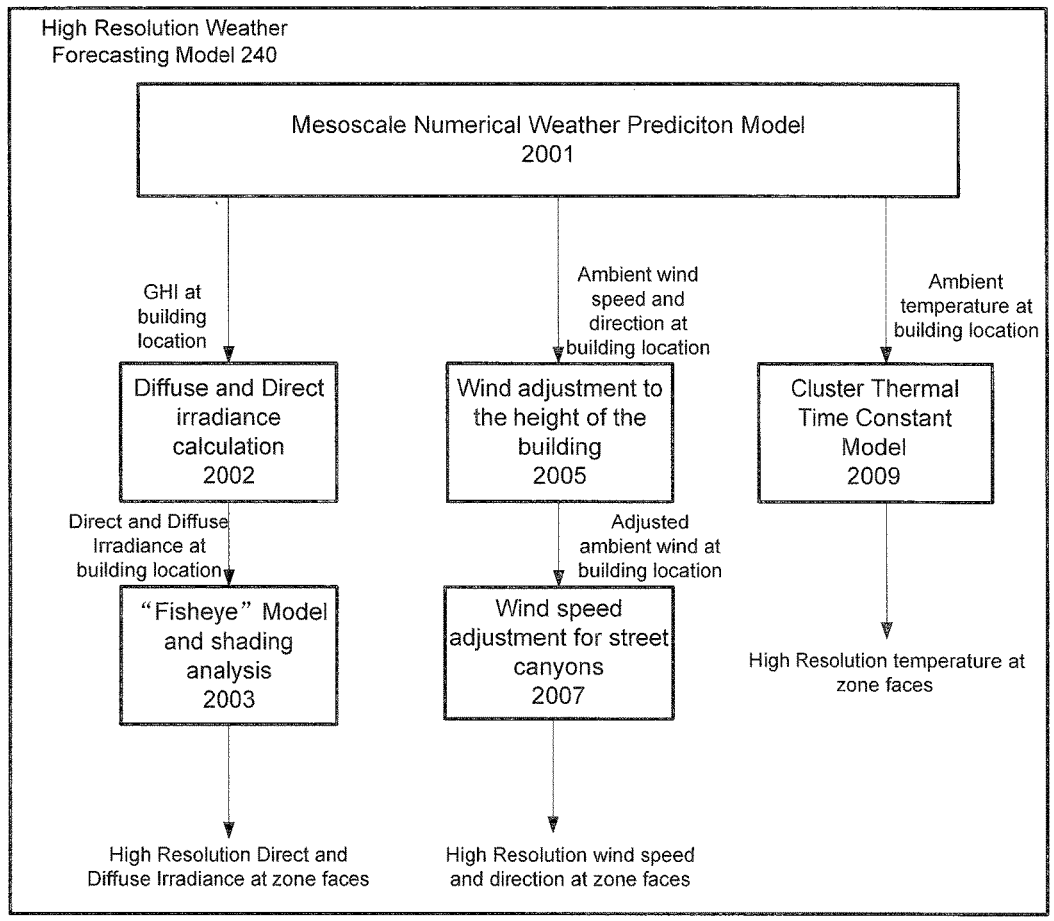
FIG. 15 is a block diagram illustrating a high resolution weather forecasting model of the predictive building control system of FIG. 2 in accordance with an embodiment of the invention; and, FIG. 16 is a graph illustrating electric power demand for a building or network of buildings in accordance with an embodiment of the invention.

FIG. 15 is a block diagram illustrating a high resolution weather forecasting model 240 of the predictive building control system 230 of FIG. 2 in accordance with an embodiment of the invention. FIG. 15 shows the high resolution weather forecasting model 240 of FIG. 2 in greater detail. In the following, the methodology and models used for high resolution weather forecasting at the building site and for building surfaces 111 is described.

The high resolution weather forecasting model 240 uses separate models for solar irradiance, ambient temperature, and wind. The irradiance model for the external surfaces (e.g., the walls and roof) 111 of a target building 100 uses a forecast irradiance from a numeric weather prediction model for a given forecast time horizon. Specifically, a mesoscale (or small scale) numerical weather prediction model 2001, such as a weather research and forecasting ("WRF") model which is a next-generation mesoscale numerical weather prediction model for operational forecasting, is used as a source for a global horizontal irradiance value. Based on this value, direct and diffuse irradiance components for each building thermal zone external surface 111 are calculated using a diffuse and direct irradiance calculation model 2002. A "fisheye" model and shading analysis 2003 are then used to determine the impact of urban obstructions (e.g., neighbouring buildings, vegetation, and the natural landscape) on the irradiance available for one or more cells 112 of the external surface 111.

In addition, an ambient wind speed and direction model uses the mesoscale numerical weather prediction model 2001 for determining a surface wind forecast at the building site. The wind speed that is forecast is then recalculated using a wind adjustment equation 2005 to adjust for the height of the building 100 and to take into account the wind direction relative to the orientation of a street canyon 1440 adjacent to the building using special models such as those proposed by Georgakis and Santamouris (Georgakis, C. and M. Santamouris, "On the Estimation of Wind Speed in Urban Canyons for Ventilation Purposes—Part 1: Coupling Between the Undisturbed Wind Speed and the Canyon Wind", Building and Environment, Vol. 43 (2008), pages 1404-1410, which is incorporated herein by reference) or those proposed by Hotchkiss and Harlow (Hotchkiss, R. and F. Harlow, "Air Pollution Transport in Street Canyons", Washington D.C.: Office of Research and Monitoring, 1973, which is incorporated herein by reference). The wind speed forecast is adjusted by the wind adjustment equation 2005 to account for the height of the building 100 using the wind power law as follows:

$$\frac{V_z}{V_G} = \left[\frac{Z}{Z_G}\right]^\alpha \quad (1)$$

In the above equation, $V_z$ is the wind speed at height Z, $V_G$ and $Z_G$ are the numerical weather prediction ("NWP") wind speeds at a height of 10 m, and $\alpha$ is an exponent whose value depends on the roughness of the building's surroundings.

Assuming that a street canyon 1400 is present, one of two sets of equations 2007 may be used to compute wind speed in the canyon 1400 taking into account the direction of the ambient wind relative to the orientation of the street canyon 1400. In particular, if the ambient wind is parallel to the canyon 1400 (which is assumed if the wind direction and street canyon direction are within 30°), then the Georgakis and Santamouris equations are used as follows:

$$u_p = U_0 \cdot \exp\left(\frac{y}{z_2}\right) \quad (2)$$

and:

$$z_2 = 0.1 \cdot h_b^2 / z_0$$

In the above equations, $U_p$ is the along-canyon wind speed, $Z_2$ is the roughness length for an unobstructed sublayer (i.e., the region from canyon bottom to the mean building height), y is the height within the canyon, $U_o$ is a reference speed (e.g., the wind speed at rooftop level), $h_b$ is the rooftop height, and $z_o$ is the roughness length.

Otherwise, in situations where the canyon 1400 and the ambient wind are more perpendicular to each other, the Hotchkiss and Harlow equations are used as follows:

$$u = \frac{A}{k} \cdot [e^{ky}(1+ky) - \beta \cdot e^{-ky}(1-ky)] \cdot \sin(kx) \quad (3)$$

and $$v = -A \cdot y \cdot (e^{ky} - \beta \cdot e^{-ky})\cos(kx)$$

where $$k = \pi/W$$
$$\beta = \exp(-2kH)$$
$$A = ku_0/(1-\beta)$$
$$y = z - H$$

In the above equations, H is the canyon height, W is the canyon width, and $u_o$ is the wind speed at x=W/2 and z=H (i.e., the middle of the canyon 1400 horizontally and top of the canyon 1400 vertically). The origin is at the top left of the canyon 1400 cross-section, where x is measured to the right, y is the vertical direction (so the canyon bottom is at y=−H), and z is the vertical distance upward from the canyon floor.

If no canyon 1400 is present, then the wind speed at a given height is computed using Equation (1) irrespective of wall orientation to wind direction.

Furthermore, the ambient temperature model 240 uses the mesoscale numerical weather prediction model 2001 for determining a surface temperature forecast. The surface temperature forecast is then recalculated to adjust for building site and surfaces using a cluster thermal time constant ("CTTC") model 2009, such as the one originally developed by Swaid and Hoffman (Swaid, H. and M. Hoffman, "Prediction of Urban Air Temperature Variations Using the Analytical CTTC Model", Energy Build., Vol. 14 (1990), pages 313-324, which is incorporated herein by reference) and later modified by Elnahas and Williamson (Elnahas, M. and T. Williamson, "An Improvement of the CTTC Model for Predicting Urban Air Temperatures", Energy Build., Vol. 25 (1997), pages 41-49, which is incorporated herein by reference) to model temperatures in urban settings. This model 2009 computes the temperature increase due to solar effects and the temperature decrease due to street canyon longwave radiative cooling to adjust the ambient (non-urban) temperature.

The modelled temperature is given by the following equations:

$$T_a(t) = T_0 + \Delta T_{a,solar}(t) - \Delta T_{NLWR}(t) \quad (4)$$

$$\Delta T_{sol}(t) = \sum_{\lambda=0}^{\lambda=t} (m/h)\Delta I(\lambda) \times (1 - \exp((\lambda - t)/CTTC)) \quad (5)$$

$$CTTC = (1 - (FA/S))CTTC_{ground} + (WA/S)CTTC_{wall} \quad (6)$$

-continued $$I(t) = I_{dir}(t)(1 - PSA(t)) + I_{dif}(t)SVF \quad (7)$$

$$\Delta T_{NLWR}(t) = \frac{(\sigma T_a^4 - \sigma Br T_a^4) \cdot SVF}{h} \cdot \frac{FA}{S} + \frac{(\sigma T_a^4 - \sigma Br T_a^4) \cdot SVF'}{h_{roof}}\left(1 - \frac{FA}{S}\right) \quad (8)$$

In the above equations: $T_o$ is the ambient temperature (i.e., the NWP temperature forecast); $\Delta T_{sol}$ is the temperature change due to solar heating; $\Delta T_{NLWR}$ is the temperature change due to longwave radiative cooling in a street canyon 1400; m is the surface absorptivity for solar radiation (=1−albedo); h is the heat transfer coefficient at the surfaces 111 (where h=9.8+4.1u, and where u is the wind speed); I is the solar irradiance on the surface 111 ($I_{dir}$ is direct and $I_{dif}$ is diffuse irradiance); PSA is the partially shaded area of the surface 111 (indicates if a cell 112 is in shadow or sunlight); SVF is the sky view factor of the surface 111; CTTC is the cluster thermal time constant (one for wall and one for ground) which is a measure of the thermal inertia of the urban environment; FA is the building footprint area; WA is the wall area of a street canyon 1400; S is the plot area; σ is the Stefan-Boltzmann constant; and, Br is the Brunt number denoting effective longwave emissivity of the atmosphere, where Br=0.51+0.076*sqrt(mean daily vapor pressure), and where vapor pressure is determined using the Clausius-Clapeyron (see, Petty, G. W., "A First Course in Atmospheric Thermodynamics", Sundog Publishing, 2008, pp. 336, which is incorporated herein by reference) relation (which depends on temperature).

These equations are applied to each cell 112 of the external surface 111. The original equations were developed assuming that urban street canyons 1400 are present. If the wall or external surface 111 of a target building 100 is not part of a street canyon 1400, then $\Delta T_{NLWR}$ is set to zero.

Note that there is no explicit height dependence in the model 240. However, height will potentially affect temperature in two ways. First, as height increases, the sky-view factor may change, which affects the amount of solar radiation that can reach the wall or external surface 111 and the amount of sky visible to the wall or external surface 111 in the longwave radiation term. Second, as height increases, the heat transfer coefficient (which depends upon wind speed) will change.

Figure 3:
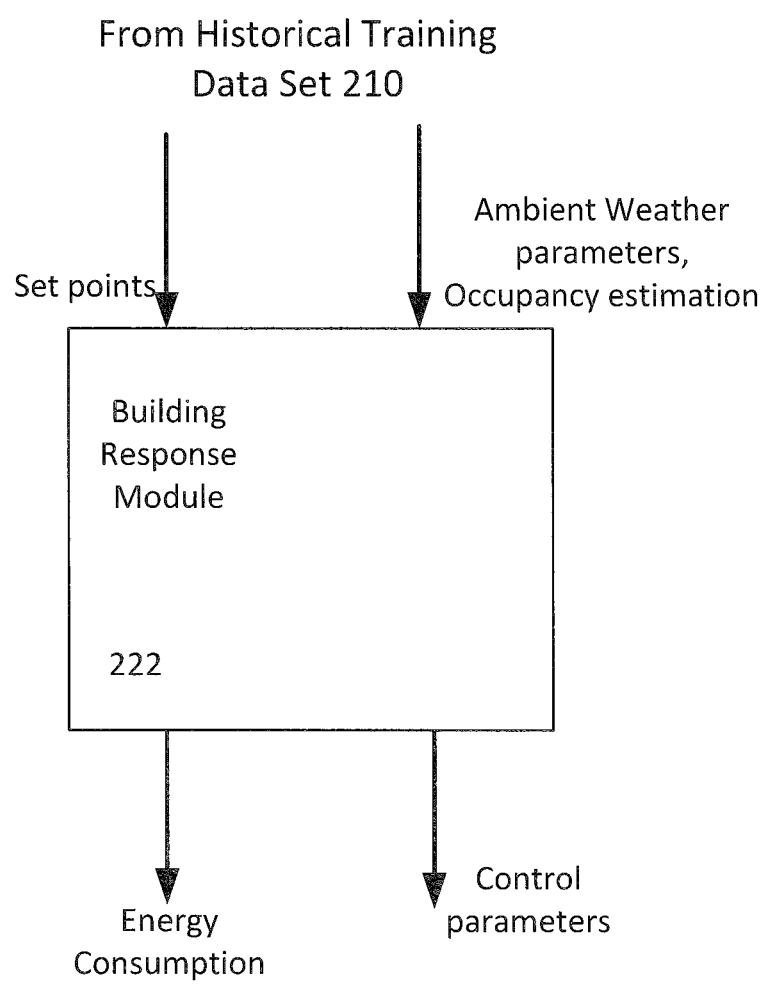
FIG. 3 is a block diagram illustrating a building response module for training the building response model of the predictive building control system of FIG. 2 in accordance with an embodiment of the invention.

FIG. 3 is a block diagram illustrating a building response module 222 for training the building response model 232 of the predictive building control system 230 of FIG. 2 in accordance with an embodiment of the invention. FIG. 3 shows the inputs and outputs to the building response module 222 of FIG. 2 in greater detail. The building response module 222 is an artificial intelligence-based model which determines changes in energy consumption and control parameters (including thermal zone temperature, air quality, humidity, etc.) of the building 100 in response to set points for the building's thermal zones 115 and changes in ambient weather conditions and occupancy. The building response module 222 operates as a generic statistical model for various building envelopes 110, thermal zones 115, and/or HVAC system 120 configurations. Building energy consumption and control parameters are two outputs of the building response module 222 and their values depend on inputs including set points, ambient weather conditions, and building occupancy and internal load information. Artificial intelligence-based techniques such as artificial neural networks, support vector machines, and various regression trees may be used to train the building response model 232. It will be understood by those skilled in the art that other artificial intelligence-based techniques may also be used to train the building response model 232.

In particular, the ambient weather condition inputs to the building response model 232 may incorporate both the ambient weather parameters at the building site and thermal zone-level ambient weather parameters including temperature (e.g., dry bulb), humidity, wind speed and direction, humidity, and solar irradiance and its components (e.g., direct and diffuse irradiance). The zone-level ambient weather parameters refer to the average values of the weather parameters on each of the external building faces or surfaces 111 related to a thermal zone 115. The building response model 232 uses zone-level ambient weather parameters to calculate thermal zone control parameters such as zone temperature, air quality, and humidity.

Figure 4:
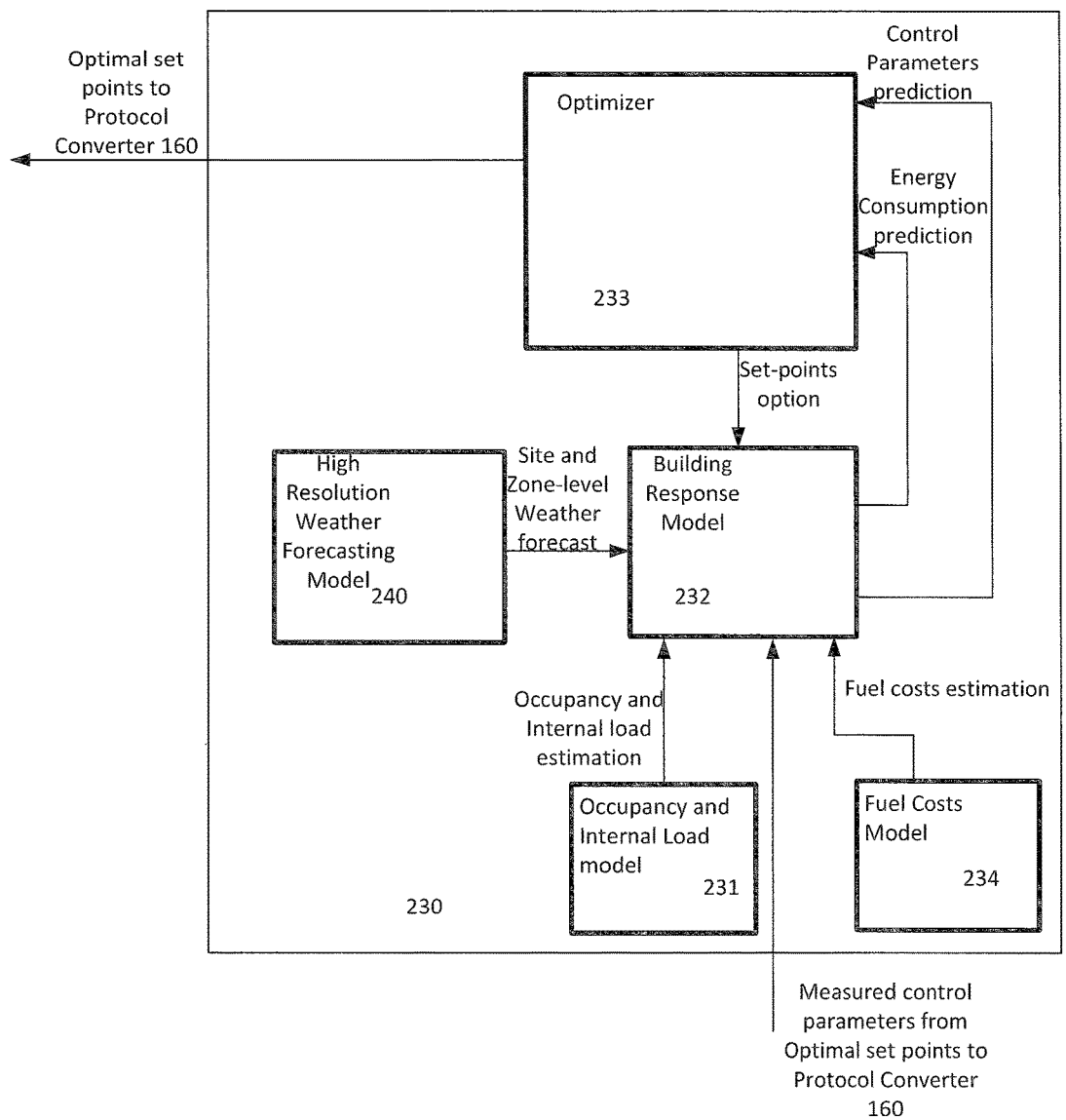
FIG. 4 is a block diagram illustrating an optimizer model of the predictive building control system of FIG. 2 in accordance with an embodiment of the invention.

FIG. 4 is a block diagram illustrating an optimizer model 233 of the predictive building control system 230 of FIG. 2 in accordance with an embodiment of the invention. FIG. 4 shows the inputs and outputs of the optimizer 233 of FIG. 2 in greater detail. The building response model 232 receives as inputs thermal zone level weather forecasts from the high resolution forecasting model 240, options for set points (or set point options) from the optimizer 233, and occupancy and internal load estimates from the occupancy and internal load model 231 and generates as outputs control parameter (e.g., temperature, air quality, and humidity) predictions for each individual zone 115 and an energy consumption prediction for the whole building 100. The optimizer 233 optimizes the building's energy consumption within the optimization time horizon while ensuring thermal comfort is maintained in all individual thermal zones 115 rather than just maintaining an average thermal comfort level for the building 100.

The optimizer 233 generates options of set points (or set point options) and passes each of the options to the building response model 232. These options refer to the possible trajectories of set point schedules from the present time to the end of the optimization horizon (see FIG. 5). Based on the weather forecasts (i.e., from the high resolution weather forecasting model 240), occupancy and internal load estimates (i.e., from the occupancy and internal load model 231), and fuel cost estimates (i.e., from the fuel costs model 234) as well as measured control parameters in the thermal zones 115 (i.e., from the building energy management system 150 via the protocol converter 160), the building response model 232 provides the optimizer 233 with the building's predicted energy consumption and with predicted thermal zone temperatures for each set point option provided by the optimizer 233. The optimizer 233 determines which set point option can minimize the value of the optimization (cost) function and constraints. For example, the cost function may directly represent energy costs and comfort deviation. Furthermore, the optimization function used by the optimizer 233 ranks the set point options in terms of their corresponding energy cost by multiplying the building's predicted energy consumption by the corresponding fuel cost or energy price estimate. The optimization function may also consider other price signals such as demand cost or demand response signals 405 of the hosting utility. The control parameter prediction may be used as a constraint in the optimization process to exclude options that would violate occupant thermal comfort levels, regardless of the amount of energy consumption produced by those options. It will be understood by those skilled in the art that the optimizer 233 may realize various optimization methodologies and search techniques. An exemplary equation for the cost function is as follows: $J=c_1*Energy+c_2*Demand+c_3*Comfort$, where $c_1$, $c_2$, and $c_3$ are the weight factors for energy cost, demand cost, and comfort penalty in terms of minimization, respectively.

According to one embodiment, an iterative search technique may be used as an optimization search technique. The iterative search technique may assume that at each point of time in the future there will be limited pre-defined set point options. An option tree is created to reflect all the set point trajectories growing from the present time over a predetermined time horizon. As the required computing resources are dependent on the number of options and prediction time horizons used, effective calculations may only be possible if there are a limited number of options and if the forecast horizon is limited in length. Branch pruning techniques as well as existing engineering constraints may be applied to simplify the option tree so that the required calculations may be performed in real-time or near real-time.

According to one embodiment, to increase the efficiency of the optimization process, a genetic algorithm may be used to realize the optimizer 233. In the genetic algorithm, the options for set points are encoded into genomes in the initial population, of which each set of set points at each time step is represented as an element of the genome. The initial population of genomes is generated randomly by taking into account all of the constraints on the control parameters. The optimizer 233 performs a series of genetic operations such as crossover, mutation, and selection on the initial population. The optimization function in the optimizer 233 acts as a fitness function in the genetic algorithm for indicating the quality of the individuals in the population. Only that portion of the individuals with higher fitness values are carried over to the next generation. The evolvement process repeats until a predefined number of generations is met or the fitness value is satisfied. The "optimal" schedule of set points 235 is then the individual with the highest fitness value in the last generation.

Figure 5:
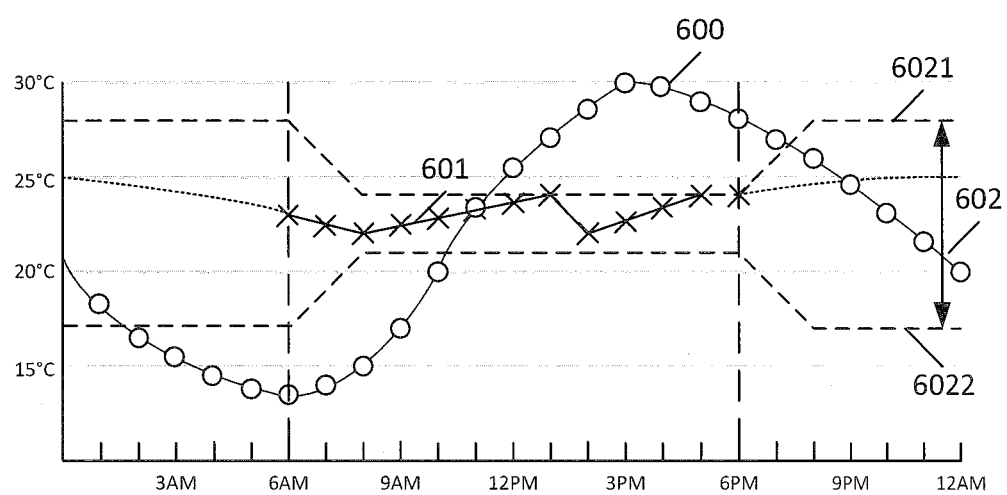
FIG. 5 is a graph illustrating a trajectory of set points generated by the optimizer model of FIG. 4 in accordance with an embodiment of the invention.

FIG. 5 is a graph illustrating a trajectory of set points 601 generated by the optimizer 233 model of FIG. 4 in accordance with an embodiment of the invention. Optimization runs on a regular basis and optimizes the schedule of set points for the building 100 for a predetermined time horizon. The building's operation mode and occupant comfort determine a zone temperature range (or desired temperature range) 602 including an upper or higher limit (e.g., 28 C in FIG. 5) 6021 and a lower limit (e.g., 17 C in FIG. 5) 6022. It will be understood by those skilled in art that in the desired temperature range 602 for commercial buildings during occupied hours (i.e., 6 am to 6 pm as shown in FIG. 5) is narrower than that during unoccupied hours (i.e., 6 pm to 6 am as shown in FIG. 5). The optimization process becomes active at 6 am with an optimization horizon of 12 hours (i.e., from 6 am to 6 pm). Therefore, the optimal schedule of set points 231 is generated over the 12-hour time horizon from 6 am to 6 pm. The actual temperature value curve 601 represents the set points scheduled at each time interval (hourly in FIG. 5) for the next 12 hours. The optimal schedule of set points 235 is proactive as it incorporates predictions of the building's response to internal and external changes in operating conditions during the optimization time horizon such as the outside temperature (dry bulb) temperature forecast (or forecast ambient temperature value) 600. As a result, the optimizer 233 operates the building 100 in the most economical way including the use of pre-cooling during start-up periods, free-floating in the morning, pre-cooling before temperature spikes in the afternoon, and free-floating again at the end of the day. Both lower peak demand and lower energy consumption may be achieved as a result of these sequential actions.

Figure 6:
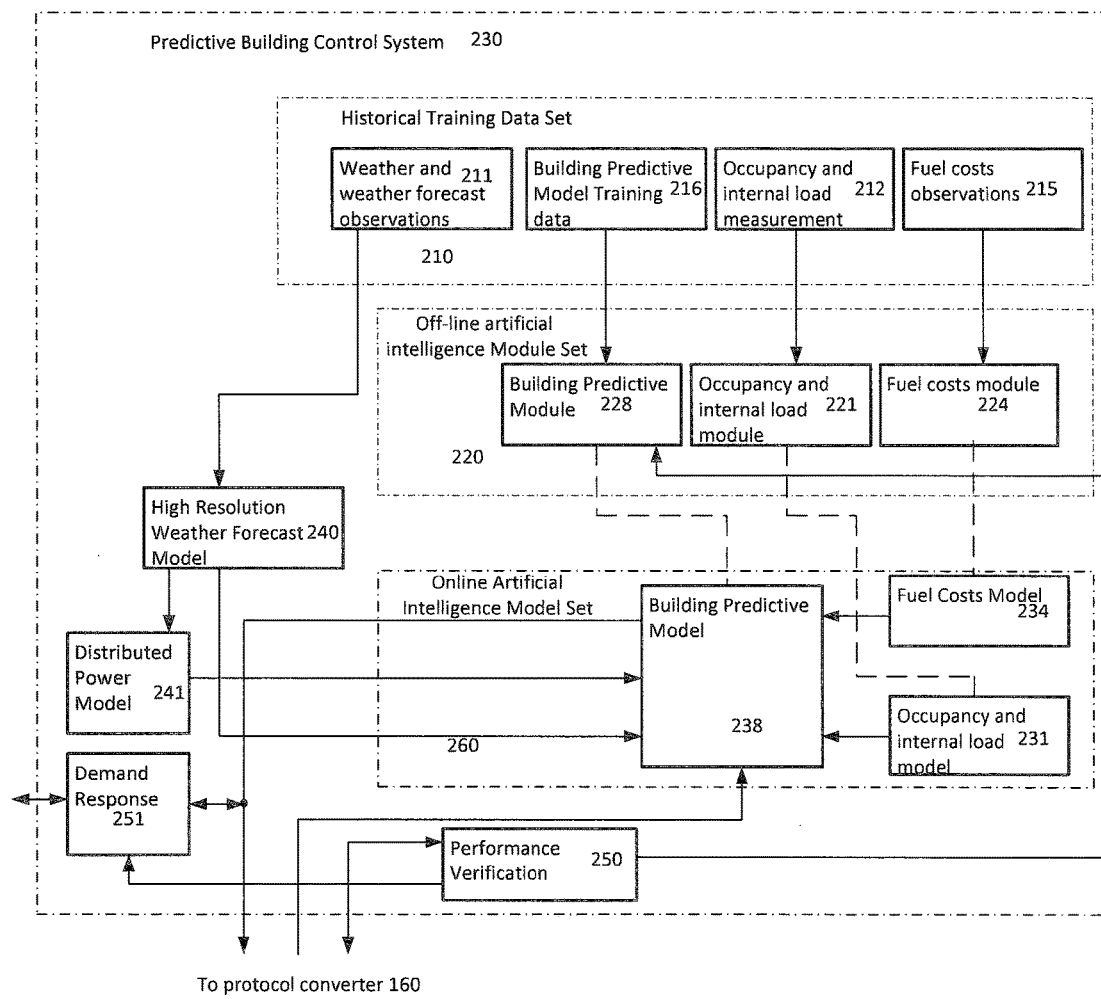
FIG. 6 is a block diagram illustrating components of a predictive building control system in accordance with another embodiment of the invention.

FIG. 6 is a block diagram illustrating components of a predictive building control system 230 in accordance with another embodiment of the invention. The basic architecture of the predictive building control system 230 of FIG. 6 is similar to that of the predictive building control system 230 of FIG. 2. However, in FIG. 6, rather than separate optimizer and building response models 233, 232, the online artificial intelligence model set 260 includes a building predictive model 238 which is coupled to the building energy management system 150 (via the protocol converter 160) and optimizes building operations in real-time. In addition, the off-line artificial intelligence module set 220 includes a building predictive module 228. The off-line artificial intelligence module set 220 runs in the background and trains or configures the online artificial intelligence models 260 running in the real-time environment. All training associated data comes from the historical training data sets 210. The building predictive module 228 may use artificial intelligence-based techniques to train the building predictive model 238.

The demand response module 251 receives demand response signals 405 from the utility demand response control system 400 with respect to the building's electricity demand and transmits these signals to the building predictive model 238. The building predictive model 238 generates set point schedules 235 and related high and low electric power demand limits 1610, 1620, determines a portion (if any) 1640 to be bid into available electric power markets in the next bidding period, and transmits this information back to the utility demand response control system 400 via the demand response module 251.

In particular, the building predictive model 238 generates set point schedules 235 and related high and low electric power demand limits 1610, 1620 to ensure thermal comfort in the building 100. The demand response module 251 determines available bidding capacity 1640 as the difference between the lowest value of the high demand limit 1610 and the highest value of the low demand limit 1620 within the bidding period 1630 to guarantee that the thermal comfort range is not violated for each next bidding period (i.e., hourly, half-hourly, or of other duration established by the electric power market) towards the established forecast horizon, and bids this capacity 1640 or a portion thereof for the next bidding period(s) into the electric power market by transmitting a bidding request to the utility demand response control system 400. The demand response module 251 receives the demand response signal 405 (e.g., a frequency response signal) requesting establishment of electricity demand within the range defined by the bidding capacity 1640, and transmits the signal 405 to the building predictive model 238 which further calculates the set points schedule 235 to meet the HVAC and internal load demands as required by the utility.

Finally, the distributed power forecasting model 241 provides forecasts of power output from the distributed power generation system 185 and/or the distributed power storage system 195 to the building predictive model 238.

Figure 7:
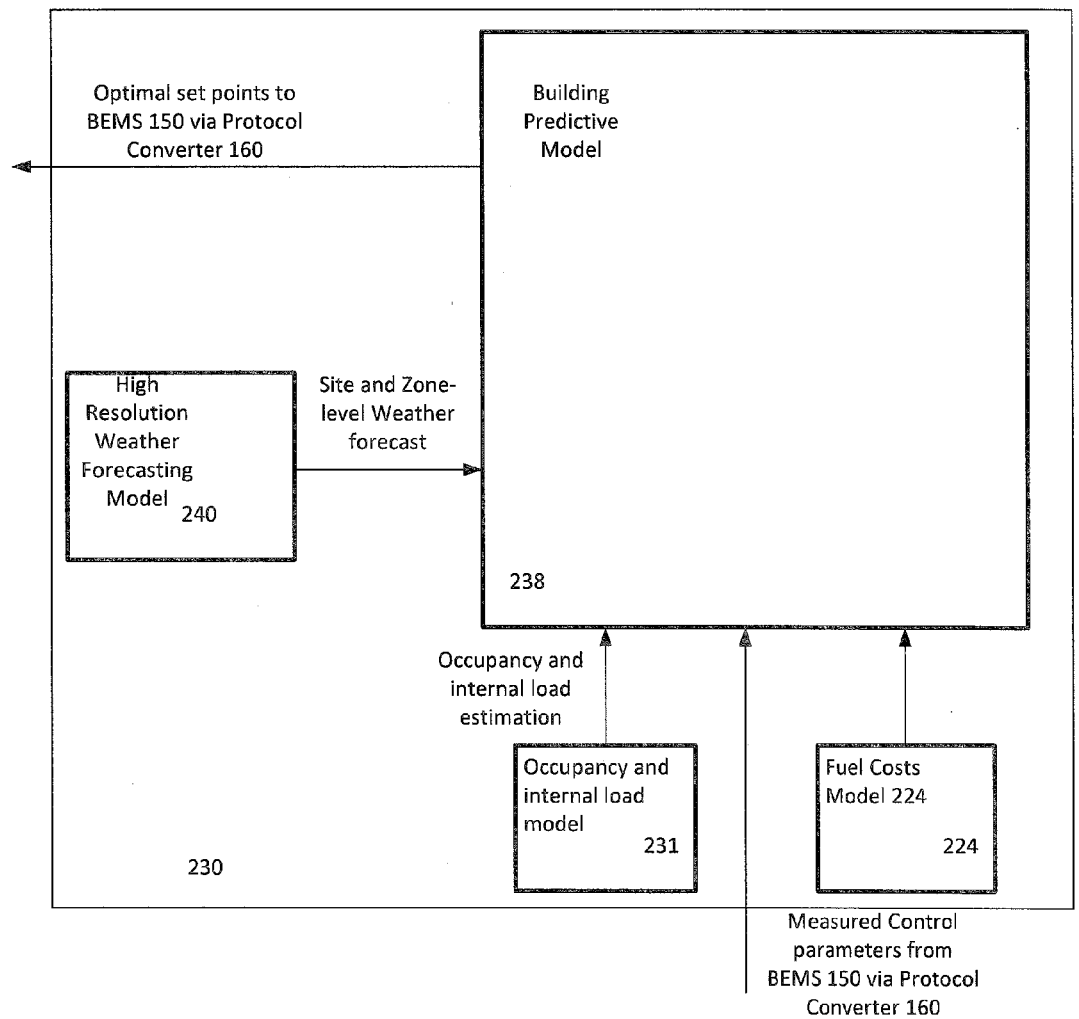
FIG. 7 is a block diagram illustrating a building predictive model of the predictive building control system of FIG. 6 in accordance with an embodiment of the invention.

FIG. 7 is a block diagram illustrating a building predictive model 238 of the predictive building control system 230 of FIG. 6 in accordance with an embodiment of the invention. FIG. 7 shows the inputs and outputs of the building predictive model 238 of FIG. 6 in more detail. The inputs and outputs of the building predictive model 238 of FIG. 6 are similar to those of the optimizer 233 model of FIG. 4. However, the functions of the building response model 232 and the optimizer 233 model of FIG. 4 are merged in the artificial intelligence-based building predictive model 238 of FIG. 7. The building predictive model 238 calculates a schedule of optimal set points 231 directly based on various inputs, including site and zone-level weather forecasts from the high resolution weather forecasting model 240, occupancy and internal load estimations from the occupancy and internal load model 231, and measured thermal zone control parameters (i.e., zone temperature, air quality, and humidity) collected from the building energy management system 150. The building predictive model 238 is a "black-box" statistical model that is trained by artificial intelligence techniques including artificial neural networks, support vector machines, and various regression trees. The building predictive model 238 is trained by the building predictive module 228 using artificial intelligence techniques. The building predictive model 238 of FIG. 7 does not require the cycling process between the optimizer 233 model and the building response model 232 combination of FIG. 4 as the building predictive model 238 may assess more set points options off-line.

Figure 8:
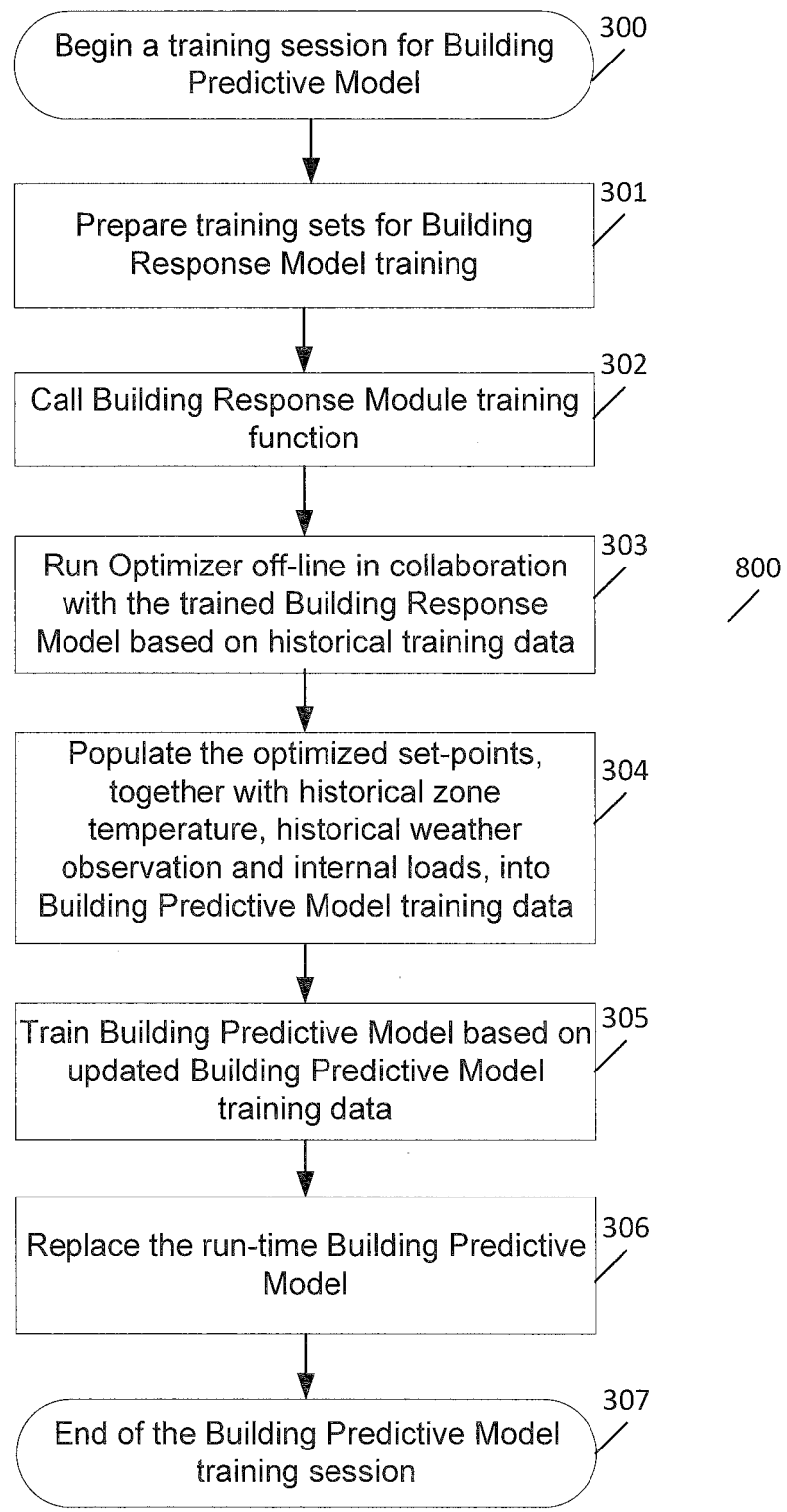
FIG. 8 is a flow chart illustrating operations of modules within a data processing system for training the building predictive model of FIG. 7 in accordance with an embodiment of the invention.

FIG. 8 is a flow chart illustrating operations 800 of modules (e.g., software modules 3310) within a data processing system (e.g., 230, 3000) for training the building predictive model 238 of FIG. 7 in accordance with an embodiment of the invention. At step 300, the operations 800 start. In particular, a training session starts by training initiation at step 300. At step 301, training sets are retrieved from the building predictive model training data 216 for building response model 232 training. Note that the training data inputs and outputs for the building response model 232 are shown in FIG. 3. At step 302, the building response module 222 runs off-line using the training data sets and trains the building response model 232. At step 303, the optimizer 233 model is run off-line in conjunction with the trained building response model 232 using historical observation data (e.g., 210) and generates a schedule of optimal set points 235 for a variety of historical building conditions (e.g., from the high resolution weather forecast model 240, occupancy and internal load estimates, and zone temperatures). At step 304, the predictive model training sets 216 are populated with the building predictive model training data as data pairs with the optimal set points schedule being the outputs and the corresponding building conditions being the inputs. The building predictive module training sets 216 have similar data inputs and outputs to those shown in FIG. 7. At step 305, the building predictive model 238 is trained based on the updated building predictive model training sets 216 by using artificial intelligence methods including artificial neural networks, support vector machines, various regression trees, and other similar methods. At step 306, the building predictive model 238 is generated after the training session and is put into operation for real-time optimization. At step 307, the building predictive model 238 training session ends. Here, the building response model 232 and the optimizer 233 work in collaboration in the off-line environment to produce training data (i.e., optimal set points) for training the building predictive model 238. Note that these are different models and are not replaceable. Thus, the present invention includes two methods, the first using the building response model 232 plus the optimizer 233, and the second using only the building predictive model 238.

As described above, since the optimizer 233 and the building predictive model 238 both run off-line to generate the training data for the building predictive model 238, there is no strict requirement for run-time performance for training data generation. In other words, the optimizer 233 is able to search more options in the embodiment of FIG. 7 than in the embodiment of FIG. 4 in order to approximate optimal set point options. Therefore, the building predictive model 238 may deliver improved optimization results as compared to the real-time optimizer 233 in combination with the building response model 232 shown in FIG. 4 in certain circumstances. In particular, the two embodiments have different features such as run-time performance (i.e., computing speed) and optimization performance (i.e., how much more energy can be saved). In certain circumstances, the run-time performance of the building predictive model 238 may be better than that of the building response model 232 plus the optimizer 233. In addition, in certain circumstances, the optimization performance of the building predictive model 238 may be better than the building response model 232 plus the optimizer 233.

Figure 9:
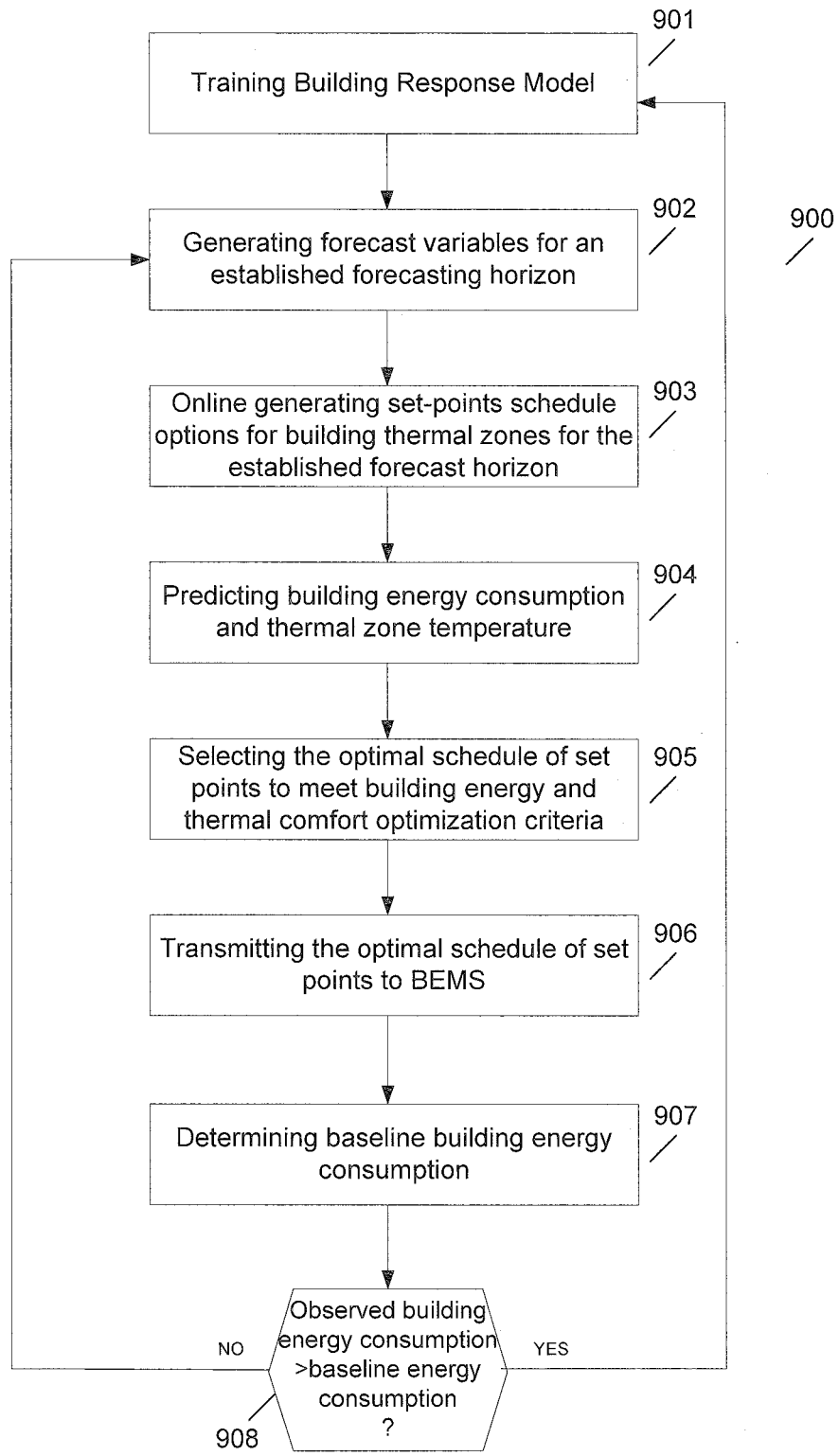
FIG. 9 is a flow chart illustrating operations of modules within a data processing system for training the building response model of FIG. 4 in accordance with an embodiment of the invention.

FIG. 9 is a flow chart illustrating operations 900 of modules (e.g., software modules 3310) within a data processing system (e.g., 230, 3000) for training the building response model 232 of FIG. 4 in accordance with an embodiment of the invention. At step 901, the operations 900 start. The artificial intelligence-based building response model 232, occupancy and internal load model 231, and fuel cost model 234 are trained using their historical training data sets 210. At step 902, forecast variables are generated for a predetermined forecast horizon. These include: high resolution weather forecast variables at the building site and building faces 111, which typically include at least wind speed and direction, dry bulb temperature, and solar irradiance; building occupancy and internal load data; and, utility rates, fuel costs, and carbon costs. At step 903, set-point schedule options for building thermal zones are generated for the forecast horizon. At step 904, building energy consumption and zone temperature are predicted using the forecast variables and various options for set point schedules provided. At step 905, the optimal schedule of set points 235 is selected to meet one or more criteria for building energy optimization including overall building energy use, building energy costs, the use of certain fuels, and the building's carbon footprint. At step 906, the optimal schedule of set points 235 is transmitted to the building energy management system 150 and the HVAC system 120. At step 907, a baseline building energy consumption in the absence of predictive building control is determined. At step 908, observed building energy consumption feedback is received from the building 100 or network of buildings 500 and is compared with the baseline building energy consumption. If the observed consumption is less than the baseline consumption by a predetermined amount or threshold, operations continue to step 901 and a signal is generated to initiate retraining for the artificial intelligence-based models 260 running in the run-time environment. As a result, the most recent observation data is retrieved and new models are trained and placed into run-time operation. Otherwise, operations continue to step 902.

According to one embodiment, when the network of buildings 500 is connected to at least one distributed power generation system 185 such as a solar photovoltaic or wind power system, the optimal schedule of set points 235 is selected at least partially based on the forecast power output of the distributed power generation system 185. In this embodiment, the selected schedule of set points 235 will maximize the use of electric power produced by this system 185 and will minimize the purchase of electric power from an electric power utility by matching the schedule of electric power consumption by the network of building 500 as received from the electric power utility to the anticipated schedule of electric power generation by the distributed power generation system 185.

According to another embodiment, when the network of buildings 500 is connected to at least one distributed power generation system 185 and to at least one distributed power storage system 195, the optimal schedule of set points 235 is selected at least partially based on the forecast power output of the distributed power generation system 185 and the forecast power output of the distributed power storage system 195. In this embodiment, the selected schedule of set points 235 will maximize the use of electric power produced by the distributed power generation system 185 and minimize the purchase of electric power from an electric power utility. This may be achieved by matching the anticipated schedule of electric power consumption received from the electric power utility to the anticipated schedules of electric power generation by the distributed power generation system 185 and the electric power use from the distributed power storage system 195.

Figure 10:
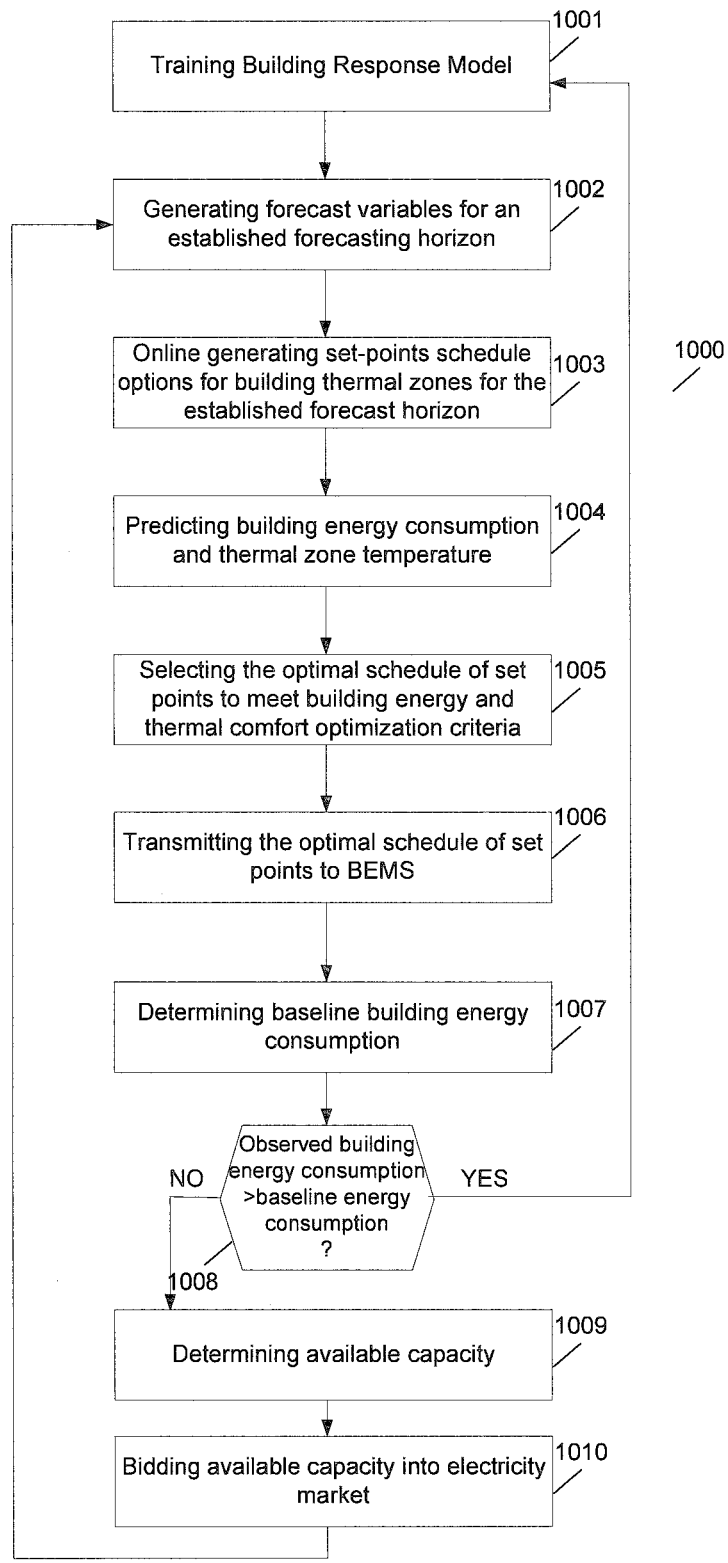
FIG. 10 is a flow chart illustrating operations of modules within a data processing system for training the building response model of FIG. 4 in accordance with another embodiment of the invention.

FIG. 10 is a flow chart illustrating operations 1000 of modules (e.g., software modules 3310) within a data processing system (e.g., 230, 3000) for training the building response model 232 of FIG. 4 in accordance with another embodiment of the invention. In FIG. 10, steps 1001-1007 correspond to steps 901-907 in FIG. 9. Where the network of buildings 500 is connected to at least one utility demand response control system 400, the optimal schedule of set points 235 may be selected to meet at least one demand response signal 405 defined by a hosting utility. In this embodiment, the selected schedule of set points 235 will keep the electric power used by the network of buildings 500 between high and low electric power demand limits 1610, 1620 according to the demand response signal 405. At step 1008, if the observed building energy consumption is below a predetermined amount or threshold of baseline energy consumption in the absence of predictive building control, operations continue to step 1009. Otherwise, operations return to step 1001. At step 1009, available demand response capacity 1640 is determined as the difference between difference between the high and low electric power demand limits 1610, 1620. At step 1010, the available capacity 1640 or part thereof is bid into available electric power markets and operations return to step 1002.

According to one embodiment, when the network of buildings 500 is connected to at least one utility demand response control system 400 and to at least one distributed power generation system 185, the optimal schedule of set points 235 is selected to meet at least one demand response signal 405 defined by a hosting utility, and at least partially based on the forecast power output of the distributed power system 185. In this embodiment, the selected schedule of set points 235 will keep the electric power used by the network of buildings 500 between the high and low electric power demand limits 1610, 1620 according to the demand response signal 405. The high and low electric power demand limits 1610, 1620 are determined taking into consideration the forecast power output of the distributed power system 185. The available demand response capacity 1640 is determined as the difference between the high and low electric power demand limits 1610, 1620. And, the available capacity 1640 or part thereof is bid into available electric power markets.

According to another embodiment, when the network of buildings 500 is connected to at least one utility demand response control system 400, at least one distributed power generation system 185, and at least one distributed power storage system 195, the optimal schedule of set points is selected to meet at least one demand response signal 405 defined by a hosting utility, and at least partially based on the forecast power output of the distributed power generation system 185 and the distributed power storage system 195. In this embodiment, the selected schedule of set points 235 will keep the electric power used by the network of buildings 500 between the high and low electric power demand limits 1610, 1620 according to the demand response signal 405. The high and low electric power demand limits 1610, 1620 are determined taking into consideration the forecast power output of the distributed power system 185 and the distributed power storage system 195. The available demand response capacity 1640 is determined as the difference between the high and low electric power demand limits 1610, 1620. And, the available capacity 1640 or part thereof is bid into available electric power markets.

Figure 11:
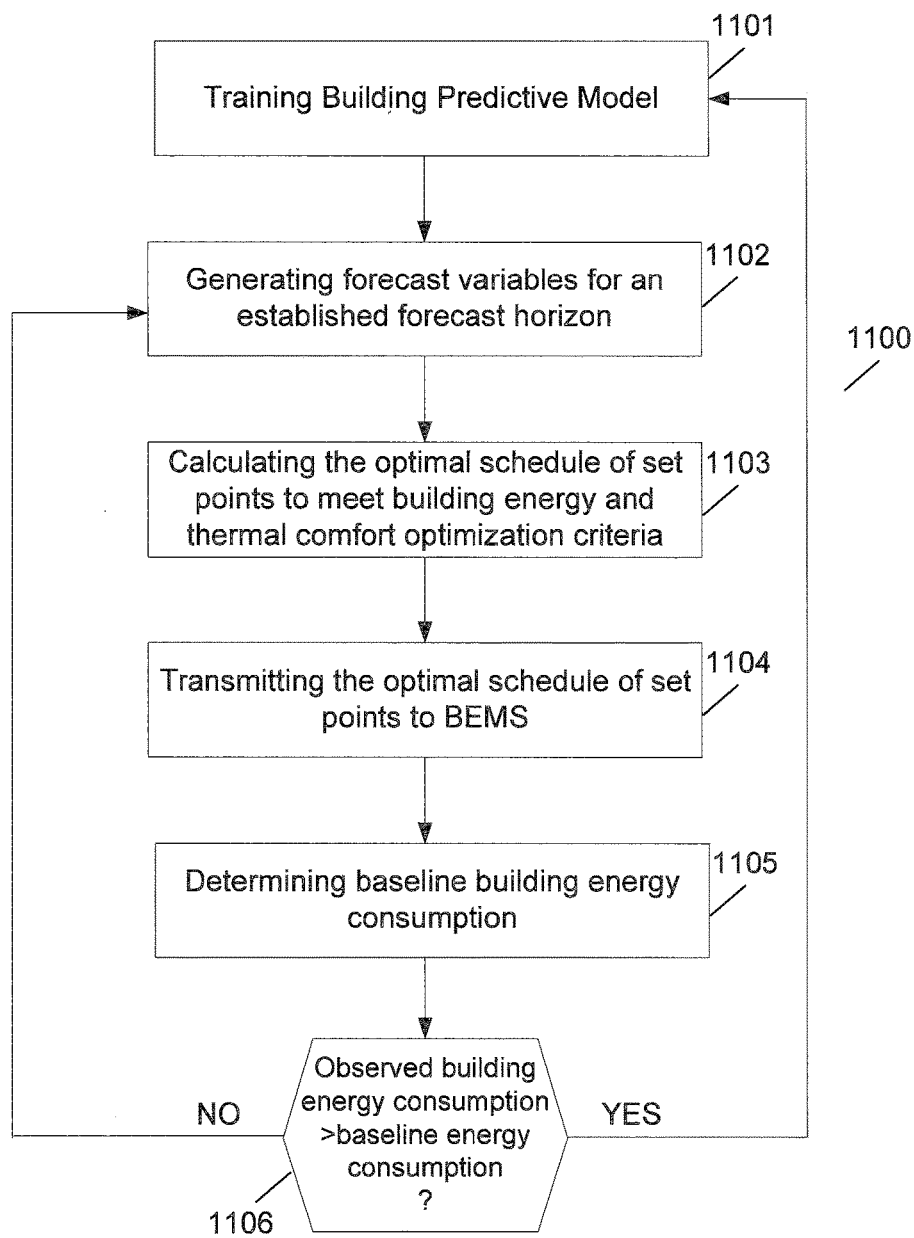
FIG. 11 is a flow chart illustrating operations of modules within a data processing system for training the building predictive model of FIG. 6 in accordance with another embodiment of the invention.

FIG. 11 is a flow chart illustrating operations 1100 of modules (e.g., software modules 3310) within a data processing system (e.g., 230, 3000) for training the building predictive model 238 of FIG. 6 in accordance with another embodiment of the invention. The operations 1100 of FIG. 11 provide an advanced optimization method to improve the run-time performance of the invention. At step 1101, the operations 1100 start. At step 1102, the artificial intelligence-based building predictive model 238, occupancy and internal load model 231, and fuel cost model 234 are trained using their respective historical training data sets 210. At step 1102, forecast variables are generated for a predetermined forecast horizon. These include: high resolution weather forecast variables at the building site and building faces 111 which may include at least wind speed and direction, dry bulb temperature, and solar irradiance; building occupancy and internal load data; and, utility rates, fuel costs, and carbon costs. At step 1103, an optimal schedule of set points is generated off-line for a variety of historical building conditions (e.g., high resolution weather forecast data, occupancy and internal load estimation data, zone temperatures, etc.). The optimal data pairs (i.e., optimal set point schedules as outputs and the corresponding building conditions as inputs) are used as training data sets for online optimization training. The online optimization model is trained by applying artificial intelligence methods to the training data sets generated off-line. The optimal schedule of set points 235 is selected through online optimization to meet one or more criteria for building energy optimization including overall building energy use, building energy costs, the use of certain fuels, and the building's carbon footprint. At step 1104, the optimal schedule of set points 235 is transmitted to the building energy management system 150 and to the HVAC system 120. The operations 1100 then continue to steps 1105 and 1106 which correspond to steps 907 and 908 of FIG. 9 described above.

Aspects of the above described embodiments may be summarized with the aid of a flowchart.

Figure 13:
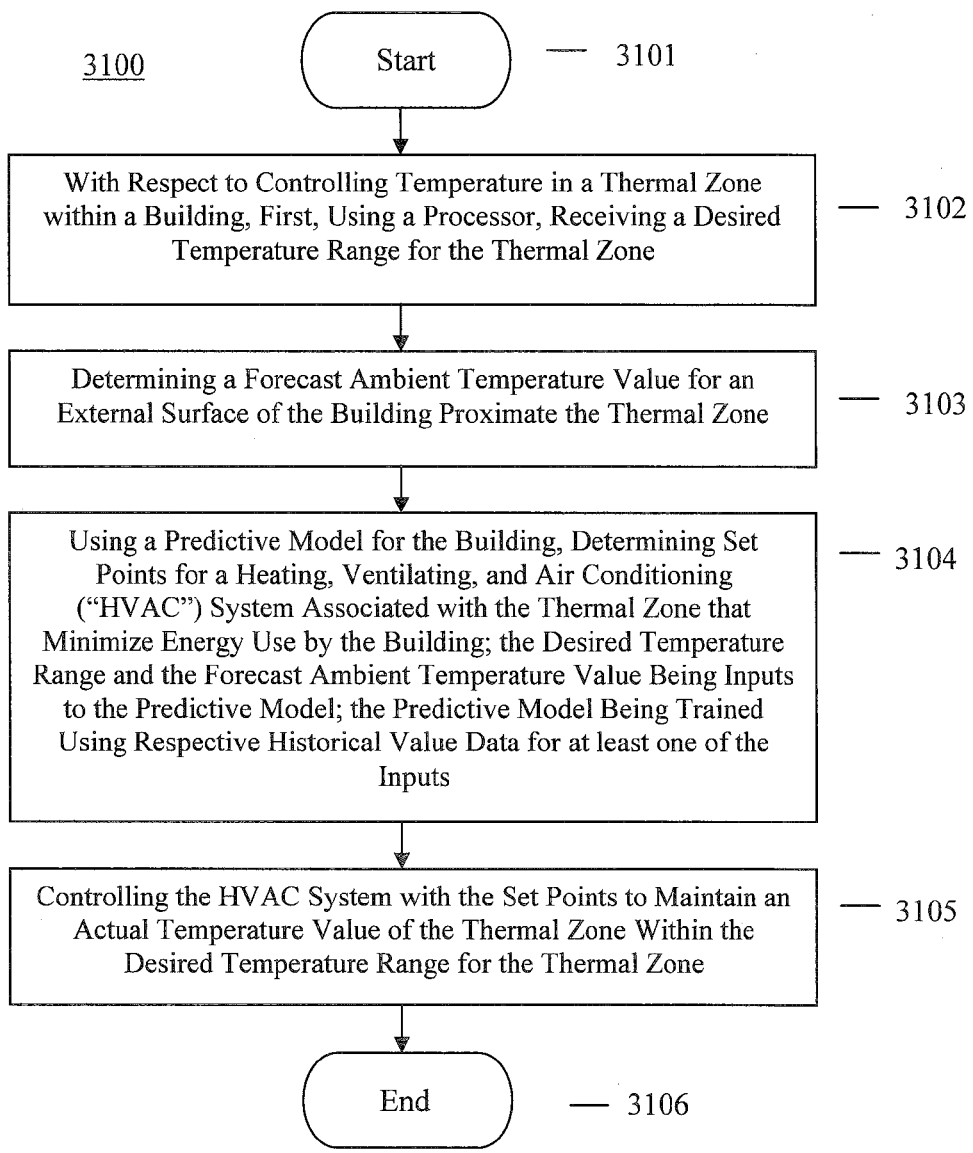
FIG. 13 is a flow chart illustrating operations of modules within a data processing system for controlling temperature in a thermal zone within a building, in accordance with an embodiment of the invention.

FIG. 13 is a flow chart illustrating operations 3100 of modules (e.g., software modules 3310) within a data processing system (e.g., 230, 3000) for controlling temperature in a thermal zone 115 within a building 100, in accordance with an embodiment of the invention.

At step 3101, the operations 3100 start.

At step 3102, using a processor 3200, a desired temperature range 602 for the thermal zone 115 is received.

At step 3103, a forecast ambient temperature value 600 for an external surface 111 of the building 100 proximate the thermal zone 115 is determined.

At step 3104, using a predictive model 238 for the building 100, set points 235 for a heating, ventilating, and air conditioning ("HVAC") system 120 associated with the thermal zone 115 that minimize energy use by the building 100 are determined; the desired temperature range 602 and the forecast ambient temperature value 600 being inputs to the predictive model 238; the predictive model 238 being trained using respective historical measured value data 210 for at least one of the inputs.

At step 3105, the HVAC system 120 is controlled with the set points 235 to maintain an actual temperature value 601 of the thermal zone 115 within the desired temperature range 602 for the thermal zone 115.

At step 3106, the operations 3100 end.

In the above method, the forecast ambient temperature value 600 may be determined using a weather forecasting model 240 that includes a mesoscale numerical weather prediction model 2001 that adjusts for ambient solar irradiance and ambient wind speed at the external surface 111, the weather forecasting model 240 being based on numerical weather predictions of ambient temperature value data 211 for the external surface 111. The method may further include determining a forecast occupancy level and internal load value for the thermal zone 115 and further determining the set points 235 using the forecast occupancy level and internal load value as ones of the inputs to the predictive model 238. The forecast occupancy level and internal load value may be determined using an occupancy level and internal load predictive model 231 that is trained using historical measured occupancy level and internal load value data 212 for the thermal zone 115.

The above method may further include determining a forecast fuel cost value for the building 100 and further determining the set points 235 using the forecast fuel cost value as one of the inputs to the predictive model 238. The forecast fuel cost value for the building is determined using a fuel cost model 234 that is trained using historical measured fuel cost value data 215 for the building 100. The method may further include receiving a forecast power output capacity value for distributed power generation and storage systems 185, 195 associated with the building 100 and further determining the set points 235 using the forecast power output capacity value as one of the inputs to the predictive model 238, the forecast power output capacity value being a forecast of power output capacity 1640 from the distributed power generation and storage systems 185, 195 associated with the building 100 that is available for at least one of powering internal building loads and feed in to a utility grid. The method may further include receiving a demand response signal 405 from a utility demand response control system 400 associated with the building 100 and further determining the set points 235 using the demand response signal 405 as one of the inputs to the predictive model 238, the demand response signal 405 indicating a desired reduction in electric power demand received by the building 100 from a utility grid. The method may further include determining a demand response capacity 1640 of the building 100 as a difference between a high electric power demand limit 1610 and a low electric power demand limit 1620, wherein the high electric power demand limit 1610 and the low electric power demand limit 1620 are associated with a lower limit 6022 of the desired temperature range 602 and a higher limit 6021 of the desired temperature range 602, and wherein the demand response capacity 1640 or a portion thereof is available for bidding into at least one of a frequency response market, an electric power market, and an ancillary services market associated with a utility grid. The high electric power demand limit 1610 and the low electric power demand limit 1620 may be determined using a forecast power output capacity for distributed power generation and storage systems 185, 195 associated with the building 100.

Also in the above method, the set points may be determined by a predictive building control system 230 that is communicatively coupled to the HVAC system 120 via a building energy management system 150 for the building 100. The desired temperature range 602 for the thermal zone 115 may be received from one of the HVAC system 120 and the building energy management system 150. The actual temperature value for the thermal zone 115 may be received from the building energy management system 150. The actual temperature value for the thermal zone 115 may be measured using a sensor 170 located in the thermal zone 115 and coupled to the HVAC system 120. The method may further include transmitting the set points 235 to the HVAC system 120 from the predictive building control system 230 via the building energy management system 150. The method may further include determining the set points 235 to minimize energy costs for the building 100. The method may further include determining the set points to minimize a carbon footprint of the building 100. The set points may be a schedule of set points 235.

Also in the above method, the thermal zone 115 may include one or more of: a room of the building 100, a floor of the building 100, and a wing of the building 100. The building 100 may be a network of buildings 500. The external surface 111 of the building 100 may be one or more of an external face 111 of the building 100, an external wall surface 111 of the building 100, an external window surface 111 of the building 100, an external roof surface 111 of the building 100, an envelope 110 of the building 100, and a portion 111 of an envelope 110 of the building 100. The forecast ambient temperature value 600 may be one or more of a forecast ambient weather condition value for the external surface 111 of the building 100 proximate the thermal zone 115, a forecast ambient wind speed value for the external surface 111 of the building 100 proximate the thermal zone 115, and a forecast ambient solar irradiance value for the external surface 111 of the building 100 proximate the thermal zone 115. The desired temperature range 602 for the thermal zone 115 may be a desired thermal comfort condition range for the thermal zone 115 and the actual temperature value 601 of the thermal zone 115 may be an actual thermal comfort condition value of the thermal zone 115. The desired temperature range 602 for the thermal zone 115 may be a desired relative humidity range for the thermal zone 115 and the actual temperature value 601 of the thermal zone 115 may be an actual relative humidity value of the thermal zone 115. The desired temperature range 602 for the thermal zone 115 may be a desired air quality range for the thermal zone 115 and the actual temperature value 601 of the thermal zone 115 may be an actual air quality value of the thermal zone 115. The predictive model 238 may be a linear model. The predictive model may be a non-linear model. The predictive model 238 may be trained off-line. And, the predictive model 238 may be trained by one or more artificial intelligence-based modules 220.

According to one embodiment, each of the above steps 3101-3106 may be implemented by a respective software module 3310. According to another embodiment, each of the above steps 3101-3106 may be implemented by a respective hardware module 3210. According to another embodiment, each of the above steps 3101-3106 may be implemented by a combination of software 3310 and hardware modules 3210. For example, FIG. 13 may represent a block diagram illustrating the interconnection of specific hardware modules 3101-3106 (collectively 3210) within the data processing system 3000, each hardware module 3101-3106 adapted or configured to implement a respective step of the method of the invention. As such, the present invention advantageously improves the operation of the data processing system 3000.

While aspect of this invention are primarily discussed as a method, a person of ordinary skill in the art will understand that the apparatus discussed above with reference to a data processing system 3000 may be programmed to enable the practice of the method of the invention. Moreover, an article of manufacture for use with a data processing system 3000, such as a pre-recorded storage device or other similar computer readable medium or computer program product including program instructions recorded thereon, may direct the data processing system 3000 to facilitate the practice of the method of the invention. It is understood that such apparatus, products, and articles of manufacture also come within the scope of the invention.

In particular, the sequences of instructions which when executed cause the method described herein to be performed by the data processing system 3000 may be contained in a data carrier product according to one embodiment of the invention. This data carrier product may be loaded into and run by the data processing system 3000. In addition, the sequences of instructions which when executed cause the method described herein to be performed by the data processing system 3000 may be contained in a computer software product or computer program product (e.g., comprising a non-transitory medium) according to one embodiment of the invention. This computer software product or computer program product may be loaded into and run by the data processing system 3000. Moreover, the sequences of instructions which when executed cause the method described herein to be performed by the data processing system 3000 may be contained in an integrated circuit product (e.g., a hardware module or modules 3210) which may include a coprocessor or memory according to one embodiment of the invention. This integrated circuit product may be installed in the data processing system 3000.

The above embodiments may contribute to an improved predictive building control system and method and may provide one or more advantages. For example, the present invention advantageously uses generic artificial intelligence-based modeling solutions for modeling building energy consumption applicable to various building characteristics and climate zones and enabling thermal response modeling of individual thermal zones 115 in a building 100. The predictive building control system 230 of the present invention applies these statistical models to analyze multiple building thermal conditions in real-time, uses advanced optimization methods to select an optimized set of set points 235, and communicates these to a BEMS 150 for the building 100 or network of buildings 500. As a result, the present invention provides for optimized building HVAC equipment operation, maintaining thermal comfort in individual thermal zones 115 based on expected changes in zone-specific ambient conditions, all while minimizing the overall energy use, and/or cost, and/or carbon footprint of the building 100 or network of buildings 500.

The embodiments of the invention described above are intended to be examples only. Those skilled in the art will understand that various modifications of detail may be made to these embodiments, all of which come within the scope of the invention.

What is claimed is:

1. A method for controlling temperature in a thermal zone within a building, comprising:

using a processor, receiving a desired temperature range for the thermal zone;

determining a forecast ambient temperature value for an external surface of the building proximate the thermal zone;

using a predictive model for the building, determining set points for a heating, ventilating, and air conditioning ("HVAC") system associated with the thermal zone that minimize energy use by the building; the desired temperature range and the forecast ambient temperature value being inputs to the predictive model;

the predictive model being trained using respective historical measured value data for at least one of the inputs and by one or more artificial intelligence-based modules;

controlling the HVAC system with the set points to maintain an actual temperature value of the thermal zone within the desired temperature range for the thermal zone;

receiving a demand response signal from a utility demand response control system associated with the building and further determining the set points using the demand response signal as one of the inputs to the predictive model; and, determining a demand response capacity of the building available for bidding at least a portion thereof into at least one of a frequency response market, an electric power market, and an ancillary services market associated with the utility grid.

2. The method of claim 1, wherein the forecast ambient temperature value is determined using a weather forecasting model that includes a mesoscale numerical weather prediction model that adjusts for ambient solar irradiance and ambient wind speed at the external surface, the weather forecasting model being based on numerical weather predictions of ambient temperature value data for the external surface.

3. The method of claim 1, further comprising determining a forecast occupancy level and internal load value for the thermal zone and further determining the set points using the forecast occupancy level and internal load value as ones of the inputs to the predictive model.

4. The method of claim 3, wherein the forecast occupancy level and internal load value is determined using an occupancy level and internal load predictive model that is trained using historical measured occupancy level and internal load value data for the thermal zone.

5. The method of claim 1, further comprising determining a forecast fuel cost value for the building and further determining the set points using the forecast fuel cost value as one of the inputs to the predictive model.

6. The method of claim 5, wherein the forecast fuel cost value for the building is determined using a fuel cost model that is trained using historical measured fuel cost value data for the building.

7. The method of claim 1, further comprising receiving a forecast power output capacity value for distributed power generation and storage systems associated with the building and further determining the set points using the forecast power output capacity value as one of the inputs to the predictive model, the forecast power output capacity value being a forecast of power output capacity from the distributed power generation and storage systems associated with the building that is available for at least one of powering internal building loads and feed in to a utility grid.

8. The method of claim 1, wherein the demand response signal indicates a desired reduction in electric power demand received by the building from a utility grid.

9. The method of claim 8, wherein the demand response capacity of the building is a difference between a high electric power demand limit and a low electric power demand limit, and wherein the high electric power demand limit and the low electric power demand limit are associated with a lower limit of the desired temperature range and a higher limit of the desired temperature range.

10. The method of claim 9, wherein the high electric power demand limit and the low electric power demand limit are determined using a forecast power output capacity for distributed power generation and storage systems associated with the building.

11. The method of claim 1, wherein the set points are determined by a predictive building control system that is communicatively coupled to the HVAC system via a building energy management system for the building.

12. The method of claim 11, wherein the desired temperature range for the thermal zone is received from one of the HVAC system and the building energy management system.

13. The method of claim 11, wherein the actual temperature value for the thermal zone is received from the building energy management system.

14. The method of claim 11, wherein the actual temperature value for the thermal zone is measured using a sensor located in the thermal zone and coupled to the HVAC system.

15. The method of claim 11, further comprising transmitting the set points to the HVAC system from the predictive building control system via the building energy management system.

16. The method of claim 1, further comprising determining the set points to minimize energy costs for the building.

17. The method of claim 16, further comprising determining the set points to minimize a carbon footprint of the building.

18. The method of claim 1, wherein the set points are a schedule of set points.

19. The method of claim 1, wherein the thermal zone includes one or more of: a room of the building, a floor of the building, and a wing of the building.

20. The method of claim 1, wherein the building is a network of buildings.

21. The method of claim 1, wherein the external surface of the building is one or more of an external face of the building, an external wall surface of the building, an external window surface of the building, an external roof surface of the building, an envelope of the building, and a portion of an envelope of the building.

22. The method of claim 1, wherein the forecast ambient temperature value is one or more of a forecast ambient weather condition value for the external surface of the building proximate the thermal zone, a forecast ambient wind speed value for the external surface of the building proximate the thermal zone, and a forecast ambient solar irradiance value for the external surface of the building proximate the thermal zone.

23. The method of claim 1, wherein the desired temperature range for the thermal zone is a desired thermal comfort condition range for the thermal zone and the actual temperature value of the thermal zone is an actual thermal comfort condition value of the thermal zone.

24. The method of claim 1, wherein the desired temperature range for the thermal zone is a desired relative humidity range for the thermal zone and the actual temperature value of the thermal zone is an actual relative humidity value of the thermal zone.

25. The method of claim 1, wherein the desired temperature range for the thermal zone is a desired air quality range for the thermal zone and the actual temperature value of the thermal zone is an actual air quality value of the thermal zone.

26. The method of claim 1, wherein the predictive model is a linear model.

27. The method of claim 1, wherein the predictive model is a non-linear model.

28. The method of claim 1, wherein the predictive model is trained off-line.

29. A predictive building control system for controlling temperature in a thermal zone of a building, comprising:
   a processor coupled to memory; and,
   at least one of hardware and software modules within the memory and controlled or executed by the processor, the modules including computer readable instructions executable by the processor for causing the predictive building control system to implement the method of claim 1.

30. A method for controlling temperature in a thermal zone within a building, comprising:
   using a processor, receiving a desired temperature range for the thermal zone;
   determining a forecast ambient temperature value for an external surface of the building proximate the thermal zone;
   using a predictive model for the building, determining set points for a heating, ventilating, and air conditioning ("HVAC") system associated with the thermal zone that minimize energy use by the building; the desired temperature range and the forecast ambient temperature value being inputs to the predictive model; the predictive model being trained using respective historical measured value data for at least one of the inputs and by one or more artificial intelligence-based modules;
   controlling the HVAC system with the set points to maintain an actual temperature value of the thermal zone within the desired temperature range for the thermal zone;
   receiving a demand response signal from a utility demand response control system associated with the building and further determining the set points using the demand response signal as one of the inputs to the predictive model, the demand response signal indicating a desired reduction in electric power demand received by the building from a utility grid; and
   determining a demand response capacity of the building as a difference between a high electric power demand limit and a low electric power demand limit, wherein the high electric power demand limit and the low electric power demand limit are associated with a lower limit of the desired temperature range and a higher limit of the desired temperature range, and wherein the demand response capacity or a portion thereof is available for bidding into at least one of a frequency response market, an electric power market, and an ancillary services market associated with the utility grid.

* * * * *